(12) United States Patent
Lee

(10) Patent No.: US 12,425,208 B2
(45) Date of Patent: Sep. 23, 2025

(54) MULTI-COMPONENT ARTICLE WITH CROSS-COMPONENT DETERMINISTIC VALUES AND UNDERLYING VALUE PROTECTION

(71) Applicant: Ballet Global Inc., Las Vegas, NV (US)

(72) Inventor: Bobby Christopher Lee, Las Vegas, NV (US)

(73) Assignee: Ballet Global Inc., Las Vegas, NV (US)

(*) Notice: Subject to any disclaimer, the term of this patent is extended or adjusted under 35 U.S.C. 154(b) by 126 days.

(21) Appl. No.: 18/410,825

(22) Filed: Jan. 11, 2024

(65) Prior Publication Data
US 2024/0146522 A1     May 2, 2024

Related U.S. Application Data

(63) Continuation-in-part of application No. 18/081,521, filed on Dec. 14, 2022, now Pat. No. 12,284,276,
(Continued)

(51) Int. Cl.
*H04L 9/08*     (2006.01)
*G06K 7/14*     (2006.01)
(Continued)

(52) U.S. Cl.
CPC .......... *H04L 9/0877* (2013.01); *G06K 7/1417* (2013.01); *G06K 19/06037* (2013.01);
(Continued)

(58) Field of Classification Search
CPC ... H04L 9/0877; H04L 9/0618; H04L 9/0866; H04L 9/30; H04L 9/3073; H04L 9/0825;
(Continued)

(56) References Cited

U.S. PATENT DOCUMENTS

| | | | |
|---|---|---|---|
| 6,109,529 A | 8/2000 | Nelson, Jr. |
| 10,554,401 B1 | 2/2020 | Lee |

(Continued)

FOREIGN PATENT DOCUMENTS

| | | |
|---|---|---|
| CN | 109784892 A | 5/2019 |
| KR | 1019507520000 A | 2/2019 |

(Continued)

OTHER PUBLICATIONS

Office Action for Korea Application no. 10-2022-7003890 dated Feb. 27, 2025, pp. 1-10.
(Continued)

*Primary Examiner* — Izunna Okeke
(74) *Attorney, Agent, or Firm* — Pillsbury Winthrop Shaw Pittman LLP

(57) ABSTRACT

A physical multi-component article with cross-component deterministic values and underlying value protection (in some cases without any on-board source of power or computing capabilities) is configured to maintain access information for a digital wallet on a decentralized computing platform, like a blockchain-based decentralized computing platform. Private access information, like private key ciphertext and key or passphrase by which the private key ciphertext may be converted to plaintext, are physically concealed with tamper-evident components such that a user can readily determine by visual inspection of the apparatus whether, and what, private access information was divulged. In some examples, a user is required to activate one or more tamper-evident features, thereby altering a visible state of the apparatus, to access certain functions of a digital wallet corresponding to the apparatus.

20 Claims, 17 Drawing Sheets

Related U.S. Application Data which is a continuation-in-part of application No. 17/561,060, filed on Dec. 23, 2021, now Pat. No. 11,799,647, which is a continuation of application No. 16/945,240, filed on Jul. 31, 2020, now Pat. No. 11,240,021, which is a continuation of application No. 16/739,998, filed on Jan. 10, 2020, now Pat. No. 10,917,238, which is a continuation of application No. 16/568,185, filed on Sep. 11, 2019, now Pat. No. 10,554,401.

(60) Provisional application No. 62/870,866, filed on Jul. 5, 2019.

(51) Int. Cl.

| | |
|---|---|
| *G06K 19/06* | (2006.01) |
| *G06Q 20/06* | (2012.01) |
| *G06Q 20/34* | (2012.01) |
| *G06Q 20/36* | (2012.01) |
| *G09F 3/00* | (2006.01) |
| *G09F 3/02* | (2006.01) |
| *G09F 3/10* | (2006.01) |
| *H04L 9/06* | (2006.01) |
| *H04L 9/30* | (2006.01) |

(52) U.S. Cl.
CPC ....... *G06Q 20/0658* (2013.01); *G06Q 20/357* (2013.01); *G06Q 20/3674* (2013.01); *G09F 3/02* (2013.01); *G09F 3/0292* (2013.01); *G09F 3/0297* (2013.01); *G09F 3/10* (2013.01); *H04L 9/0618* (2013.01); *H04L 9/0866* (2013.01); *H04L 9/30* (2013.01); *H04L 9/3073* (2013.01); *G09F 2003/0213* (2013.01); *G09F 2003/0263* (2013.01); *G09F 2003/0277* (2013.01)

(58) Field of Classification Search
CPC ....... H04L 9/0897; H04L 9/14; H04L 9/3226; H04L 9/50; H04L 2209/56; G06K 7/1417; G06K 19/06037; G06Q 20/0658; G06Q 20/357; G06Q 20/3674; G09F 3/02; G09F 3/0292; G09F 3/0297; G09F 3/10; G09F 2003/0213; G09F 2003/0263; G09F 2003/0277; G09F 2003/0276; G09F 2003/0279; G09C 5/00

See application file for complete search history.

(56) References Cited

U.S. PATENT DOCUMENTS

| | | |
|---|---|---|
| 2013/0166455 A1 | 6/2013 | Feigelson |
| 2018/0225638 A1 | 8/2018 | Ryann et al. |
| 2019/0001734 A1 | 1/2019 | Meier |
| 2019/0197378 A1 | 6/2019 | Garner |
| 2020/0295935 A1* | 9/2020 | Kayan ............... G06Q 30/0185 |
| 2023/0121749 A1 | 4/2023 | Lee |

FOREIGN PATENT DOCUMENTS

| | | |
|---|---|---|
| KR | 1019760270000 A | 4/2019 |
| WO | 2014091252 A1 | 6/2019 |

OTHER PUBLICATIONS

Chinese Office Action for App. No. 202080062425.9 dated Jan. 25, 2025, pp. 1-5.

Jon Southurst, Review: Ravenbit Keeps Physical Bitcoin Meme Alive, Jan. 4, 2015 (updated Mar. 6, 2023), downloaded Feb. 5, 2024—https://www.coindesk.com/markets/2015/01/04/review-ravenbit-keeps-physical-bitcoin-meme-alive/.

CoinsWeekly, The World's First QR Coded Coin, Apr. 11, 2019. https://coinsweekly.com/the-worlds-first-qr-coded-coin/.

Anonymous Mint, John Hoyle © 2013, downloaded Feb. 5, 2024. http://www.anonymousmint.com/1-oz-silver-bitcoin.html.

Lee, Bobby; World's Easiest Ballet Cryptocurrency Cold Storage—Making Crypto Easy, Copyright © 2024 Ballet Global Inc., Jan. 7, 2024—https://web.archive.org/web/20240107213200/https://www.ballet.com/.

Ballet Global Inc., Ballet Cryptocurrency Wallet—Making Crypto Easy, What is Ballet?, Copyright © 2022 Ballet Global Inc., Jan. 5, 2023—https://web.archive.org/web/20230105204758/https://www.ballet.com/whatisballet/.

Ballet Global Inc., Ballet Cryptocurrency Wallet—Making Crypto Easy, Quick Start, Copyright © 2023 Ballet Global Inc., Apr. 12, 2023—https://web.archive.org/web/20230412183523/https://www.ballet.com/quick-start/.

Ballet Global Inc., Ballet Cryptocurrency Wallet—Making Crypto Easy, Crypto Gift Cards, Copyright © 2023 Ballet Global Inc., Jun. 7, 2023—https://web.archive.org/web/20230607204802/https://www.ballet.com/cgc/.

Ballet Global Inc., Ballet Real Series—Ballet Cryptocurrency Wallet—Making Crypto Easy, Copyright @ 2022 Ballet Global Inc., Jan. 5, 2023—https://web.archive.org/web/20230105204805/https://www.ballet.com/real/.

Extended European Search Report dated Oct. 23, 2023 for related EP Application No. 20836065.1.

* cited by examiner

MULTI-COMPONENT ARTICLE WITH CROSS-COMPONENT DETERMINISTIC VALUES AND UNDERLYING VALUE PROTECTION

CROSS-REFERENCE TO RELATED APPLICATIONS

This patent application is a continuation-in-part of U.S. patent application Ser. No. 18/081,521, titled Customizable Cryptocurrency Card, filed 14 Dec. 2022, which is a continuation-in-part of U.S. patent application Ser. No. 17/561,060, filed 23 Dec. 2021, which is a continuation of U.S. patent application Ser. No. 16/945,240, filed 31 Jul. 2020, which is a continuation of U.S. patent application Ser. No. 16/739,998, filed 10 Jan. 2020, which is a continuation of U.S. patent application Ser. No. 16/568,185, filed 11 Sep. 2019, which claims the benefit of U.S. Provisional Patent Application No. 62/870,866, titled PHYSICAL, TAMPER-EVIDENT CRYPTOCURRENCY CARD, filed on 5 Jul. 2019. The entire contents of each aforementioned filing are incorporated herein by reference.

BACKGROUND

1. Field

The present disclosure relates generally to managing digital bearer assets and more specifically to physical implements for storing credentials by which wallet accounts of distributed computing systems are accessed to manage cryptographic currency and other digital bearer assets.

2. Description of the Related Art

Decentralized computing systems are used to generate assets, like a digital currency or, more generally, digital assets that may include coins, tokens, and the like, often within a complicated multi-actor online ecosystem Like physical currencies and commodities, some digital assets may exhibit similar properties including having an associated value, rivalrousness, and fungibility (or in some cases, like ERC 721 tokens, non-fungibility). Often, decentralized computing platform can allow for investment and transfer-of-ownership of assets between participants. Although many people currently engage with such platforms, the barrier to entry is relatively high due to the complicated nature of the systems and the absence of mature, well designed user interfaces to abstract away that complexity. Specifically, current currency (a term used herein to refer generally to digital bearer assets, like cryptocurrency, utility tokens, and the like) management systems are relatively technical in nature and their failure modes deter many less sophisticated users who would otherwise wish to access decentralized computing platforms.

Examples of existing currency management systems include powered hardware devices with integrated logic, such as a mobile phone or USB key-like device for storing secret keys backing user cryptographic currency accounts. Such schemes are commonly known as hardware wallets, which often store private and public (or other or addresses) cryptographic keys of accounts on various decentralized computing platforms, often also referred to as wallets (but without the "hardware" qualifier). With these wallets, users of a platform transact (e.g., send, receive, loan, borrow, subject to security interests, release security interests) in digital bearer assets (e.g., exchange ownership of an asset or amount of an asset). Users often backup their secret key(s), such as on an RFID backup card or physical sheet of paper, which provides a volatile failure point. Other backups, such as online, or other redundant measure, increases the attack surface for nefarious actors to gain access to secret keys. Should a nefarious user gain access to a secret key backing a cryptographic currency account, that nefarious user may liquidate the totality of that account without user recourse. Accordingly, there are complicated considerations and tradeoffs concerning the security and back-up of those secret keys. Unsophisticated users face difficulty in navigating these challenges and often choose not to participate in crypto current platforms as a result.

SUMMARY

The following is a non-exhaustive listing of some aspects of the present techniques. These and other aspects are described in the following disclosure.

Some aspects include an apparatus for physically maintaining digital wallet credentials, comprising a substrate having a surface area corresponding to a face of the substrate, the surface area comprising a first region of the surface area including a first unique identifier, and a second region of the surface area including a passphrase; and a multi-layer sticker affixed to the face of the substrate, the multi-layer sticker comprising a first layer concealing all or some of the second region of the substrate without concealing the first unique identifier within the first region, and having disposed thereon: a second unique identifier, and encrypted private key information, the encrypted private key information based on the passphrase and a private key of a key-pair; a second layer encapsulating a portion of the first layer to conceal the encrypted private access information without concealing the first unique identifier and the second unique identifier, the second layer comprising at least one tamper-evident feature and having disposed thereon: a third unique identifier, and public access information. A correspondence of values of the unique identifiers indicates a correspondence between the passphrase, the encrypted private key information, and the public access information.

Some aspects include an apparatus for physically maintaining digital wallet credentials comprising a multi-layer sticker. The multi-layer sticker comprising a first information layer comprising a first identifier and private key ciphertext information, the private key ciphertext information associated with a passphrase by which a private key is obtainable in plaintext based on the private key ciphertext information and the passphrase; a first adhesive layer by which the first information layer is adhered to a surface; a second information layer comprising a second identifier and public information associated with the private key plaintext, the second information layer concealing a portion of the first information layer comprising the private key ciphertext information without concealing the first identifier; and a second adhesive layer by which the second information layer is adhered to the surface, the second adhesive layer configured to render visually evident lifting of the second information layer from the surface to reveal the concealed portion of the first information layer; and a substrate comprising a first surface region including the passphrase disposed thereon and the surface to which the multi-layer sicker is adhered; and a second surface region including a third identifier. A correspondence of values of the unique identifiers indicates a correspondence between the passphrase, the private key ciphertext information, and the public information.

Some aspects include a tamper-evident sticker with at least two physical layers, one of which is partially concealed by the other. The top, exposed layer includes an optical code (e.g., a QR code, bar code, or the like). The optical code, in some cases, includes a redundancy of encoded information (e.g., such as in the form of parity bits, Reed-Solomon error correction, Turbo codes, Hamming codes, or the like). Some embodiments of an optical code may include sufficient redundancy to recover a damaged bit or byte of encoded information. Example embodiments of an optical code may encode an identifier of an address that corresponds to a public key of a public-secret (e.g., public-private) key-pair of an asymmetric encryption algorithm. Examples of a key-pair may be generated, in some embodiments, with one of the following classes of asymmetric encryption techniques: Diffie-Hellman; Digital Signature Standard; ElGamal; elliptic curve techniques; Rivest-Shamir-Adleman ("RSA"), lattice-based cryptography, and the like.

Some aspects of a sticker, like a tamper-evident sticker, include a top layer of the sticker that includes a window to a portion of an underlying layer. Through the window a unique identifier may be exposed from the underlying layer. Each of the top layer of the sticker, underlying layer of the sticker, and a substrate to which the sticker is affixed may include such a unique identifier, the correspondence thereof being indicative of a correspondence of information associated, respectively, with one or more layers of the sticker and substrate to which the sticker is affixed. For example, the top layer may include a corresponding unique identifier, the identifier being displayed to permit a user to verify the unique identifier of the top layer matches the unique identifier of the exposed portion of the underlying layer. A substrate (or object) may also include a corresponding unique identifier. The unique identifier may correspond to a serial number within a namespace of an issuer of a substrate (or object) to which the sticker is affixed, and matching of the unique identifiers across the different components may be indicative of their correspondence to each other component. In some embodiments, additional unique identifiers (like keys for key-value pairs) are utilized server-side by the issuer, such as to uniquely associate an informational component or combination of information included on a substrate, which may be cryptographically hashed, with other information in a database. The lower layer of the sticker may include content that is concealed by the top layer and removal of the top layer to reveal the content of the lower layer may be rendered physically evident.

Some aspects of a sticker, like a tamper-evident sticker, may include a top layer of the sticker that includes a tamper-evident adhesive substrate, lifting of which from a surface the substrate adheres to creates a tamper-evident effect which, by visual inspection, a user can ascertain whether the top layer has been lifted to expose at least a corresponding part of the surface. In some aspects, a portion of the surface adhered to includes the concealed portion of the lower layer. In some aspects, a portion of the surface adhered to includes the concealed portion of the lower layer. In some aspects, a portion of the surface adhered to includes a front or back of the substrate, which substantially surrounds the lower layer. The concealed portion has printed thereon another optical code encoding a cipher text, the plaintext of which is the secret key of the key pair. The ciphertext may be encrypted with a symmetric encryption protocol using an encryption key, and thus may later be decrypted using the encryption key. In some examples, the substrate may include the encryption key, which may be marked (e.g., engraved) on the substrate. In some aspects, the encryption key is concealed. In some aspects, the encryption key is concealed in a tamper-evident manner In some examples, the encryption key is concealed by a tamper-evident adhesive substrate. The substrate may include a corresponding unique identifier, which may be marked (e.g., engraved, etched, or printed) on the substrate, the identifier being displayed to permit a user to verify the unique identifier of the substrate matches the unique identifiers of one or more physical layers of the sticker.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 6C, FIG. 6D, FIG. 6E, and FIG. 6F illustrate examples of components of a multi-component sticker, according to some embodiments.

Figure 1:
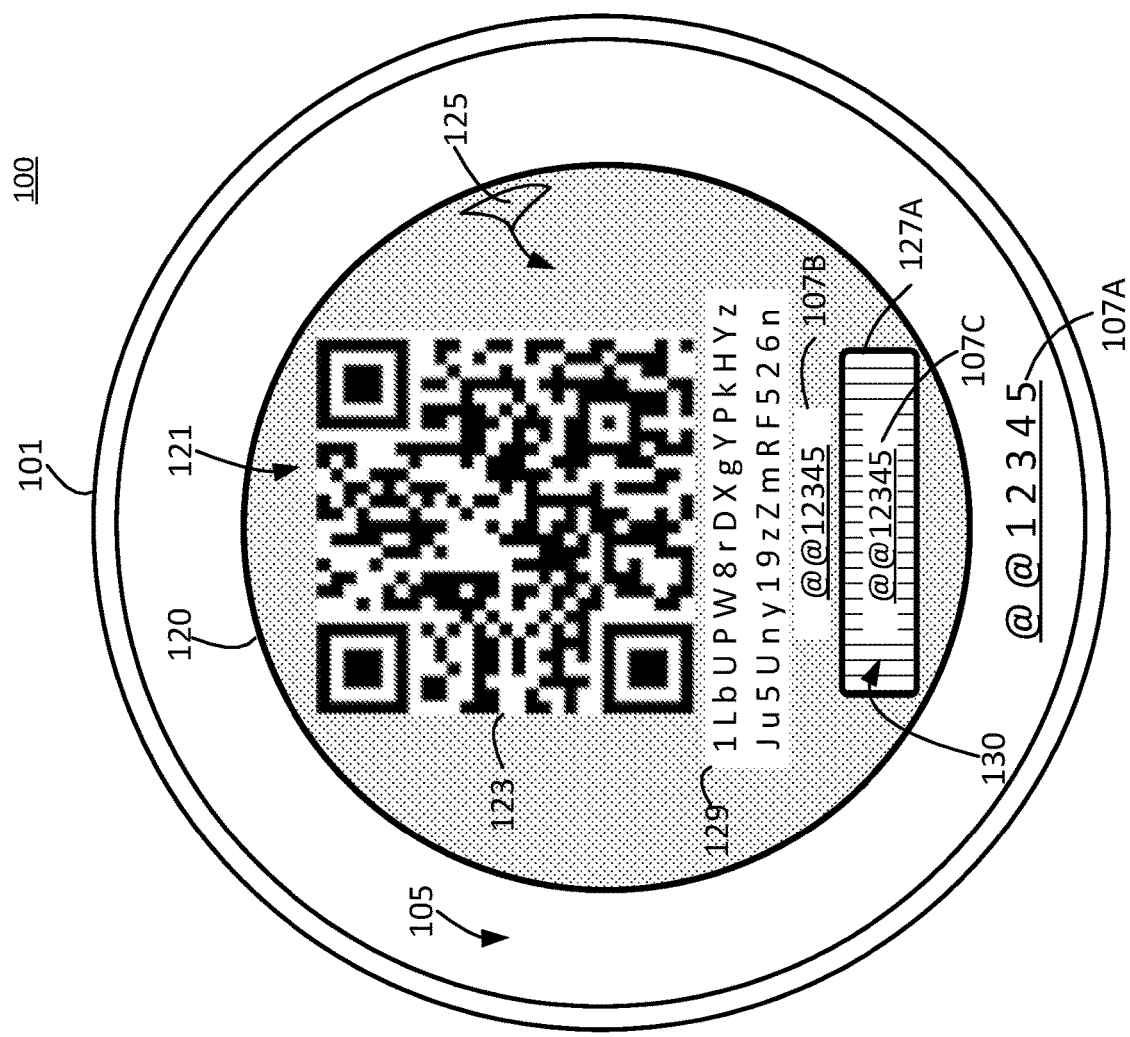
FIG. 1 and FIG. 2 illustrate examples of a substrate and multi-layer sticker apparatus including example tamper-evident features and verification features, according to some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of decentralized computing platforms and digital bearer assets. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some embodiments, a physical apparatus (in some cases without any on-board source of power or computing capabilities) is configured to maintain access information for digital bearer assets. Examples of the apparatus may include a substrate to which a multi-layer sticker is affixed. Examples of the substrate may be a card, round token (e.g., like the size of a casino chip, or larger or smaller than such a chip), or other physical object substrate consistent with the description herein, which is not to suggest that other examples are not contemplated by the disclosure, like other physical products to which a multi-layer sticker may be affixed, such as serialized products which may optionally include one or more informational components that may be concealed with a multi-layer sticker or other tamper-evident means. Examples of access information may include a secret, private key having a corresponding public key, like a cryptographic key-pair of an asymmetric encryption algorithm, or representations thereof (like a ciphertext thereof). Access information may further include one or more other encryption keys operable to decrypt a representation of a key of a key pair (like decryption with a symmetric key of a symmetric encryption algorithm). In some example embodiments, access information may include a cryptographic hash address, such as a cryptographic hash address operable to receive digital bearer assets, like a wallet (or account) address. Thus, for example, access information may include an encrypted representation of a private key, such as a private key having a corresponding public key from which a cryptographic hash address is derived, an encryption key (or passphrase) by which the private key is encrypted to generate the encrypted representation thereof, and the cryptographic hash address (or the public key or information by which the public key or the cryptographic hash address can be derived). Thus, the access information may include private access information (e.g., a private key of a key-pair or information by which the private key can be derived) by which the holder of the apparatus may transfer digital bearer assets from an account corresponding to the apparatus (e.g., by signing a transaction using the private key) and may include public access information (e.g., a cryptographic hash address or information by which the cryptographic hash address can be derived, like a public key of the key pair) by which digital bearer assets may be transferred to the account corresponding to the apparatus. Other variations are also discussed herein.

Various embodiments of a physical apparatus are devised to provide a robust mechanism for maintaining access information. Some embodiments of a physical apparatus include a substrate, like a card, like a plastic card, metal card, or other rigid, semi-rigid, flexible, or semi-flexible material, with the form factor of a credit card or gift card, although other form factors may be used. Accordingly, some embodiments include a rectangular physical card approximately 86 mm (~3 and ⅜ inches)×54 mm (~2 and ⅛ inches), such as 85.60 mm×53.98 mm, and which may have rounded corners with a radius of approximately 2.88-3.48 mm, such as to conform to the ISO/IEC 7810 ID-1 standard (described dimensions may be varied plus-or-minus 10% or plus-or-minus 20%, in addition to other expressed ranges). Other example form factors may be a ratio or portion (e.g., half, widthwise or lengthwise) of a form factor of a credit card. In some embodiments, a physical card, such as card having dimensions similar to those described above, is physically intuitive and familiar. In addition, a physical card is unlikely to be accidentally discarded or lost. In some cases, the card has a thickness of between 0.1 and 2 mm, like between 0.2 and 1 mm Other examples of substrates may have different dimensions, whether in various different shapes or sizes, and may range from approximately the size of a stamp to the size of a credit card, or larger.

Some embodiments of a physical apparatus include a substrate, like a round token or chip-like substrate, which may be referred to herein as a "chip." Contextual examples of a chip-like substrate may include round substrates having dimensions similar to casino chips or tokens, challenge coins, or physical currency coins (e.g., like a quarter, half dollar, silver dollar etc.). Round substrates may have a construction similar to those of card-like counterparts, for example, they may be a plastic, metal, or other rigid, semi-rigid, flexible, or semi-flexible material, having a given form factor. Example form factors may range from approximately 19 mm (~0.75 inches) to 100 mm (~4 inches) in diameter, like 25 mm (~1 inches) to 54 mm (~2 and ⅛ inches), although other smaller or larger form factors may be used. Example chips may have rounded edges, an example radius of which may be approximately 2.88-3.48 mm Example chips may have a thickness of between 0.1 and 5 mm, depending on a desired weight, stiffness, or other property based on the material and use case. Described dimensions may be varied plus-or-minus 10% or plus-or-minus 20%, in addition to other expressed ranges. Some embodiments of chips may fit within the footprint of example rectangular physical cards, such as by having a diameter no larger than approximately 54 mm (~2 and ⅛ inches), which may facilitate their storage in pockets configured to hold such rectangular cards. Like a physical card, chips may be unlikely to be accidentally discarded or lost.

In some example use cases, a substrate of the apparatus may be, as a design choice, less robust than a plastic or a metal, and constructed of poster stock or other material having a durability similar to that of a business card. For example, it may be desirable that a substrate be configured as a one-time use (or access) item to be used within a relatively short timeframe (e.g., within a week, month, or a few years) and more readably disposable than a plastic or metal counterpart (which is not to suggest that plastic or metal substrates may not be similarly configured).

In some embodiments, a physical apparatus for maintaining access information has a tamper-evident sticker (or paring of stickers) with at least two physical surfaces (e.g., top and bottom surfaces of a single sticker, or top surfaces of a pair of overlaid stickers), one of which is partially concealed by the other. Each surface may have a different, but related code, like a human-readable code or optical code (e.g., a QR code, bar code, or the like, in some cases with redundancy of encoded information, such as in the form of parity bits, Reed-Solomon error correction, Turbo codes, Hamming codes, or the like, in some implementations with sufficient redundancy to recover a damaged bit or byte of encoded information). The top surface may be exposed when the apparatus for maintaining access information is an un-accessed state (i.e., before access information corresponding to a private key has been rendered viewable or otherwise accessible to the user) and may include an optical code (e.g., a QR code) that encodes, for example, account or wallet address information, or another identifier, which may correspond to an account or wallet address (e.g., by association within a database). An account or wallet address may be generated based on a public key of a key-pair that includes the private key. For example, a wallet address may be generated based on a public key in accordance with a schema specified by a protocol of a decentralized computing platform.

An example of a wallet address may be a cryptographic hash address generated based on the public key (e.g., via a protocol of a decentralized computing platform, like a blockchain based computing platform, where the protocol specifies a schema for generating cryptographic hash addresses operable on the platform). Thus, for example, an optical code visible (e.g., on a surface of a sticker) in the un-accessed state of the apparatus may correspond to a cryptographic hash address such that digital bearer assets, like cryptographic currency, tokens (e.g., NFTs), or other assets (e.g., resident or tracked on the platform to which the cryptographic hash address corresponds), may be transferred to the address. In another example, the optical code visible in the un-access state of the apparatus may be an identifier by which a cryptographic hash address or public key may be identified within a database (e.g., of the issuer of the apparatus or other entity). In the un-accessed state, at least part (e.g., all, or more than 20%, more than 50%, or more than 90%) of a bottom or underlying surface depicting another optical code thereon is concealed (e.g., obfuscated, not visible, not readable, or otherwise inaccessible) by the top surface. The obfuscated optical code may be a different optical code from the un-concealed optical code. In some cases, the optical code on the top surface (also called a top-component of a multi-component sticker herein) encodes a representation (e.g., like a cryptograph hash address in plain text or ciphertext form) based on a public key of the key-pair (e.g., a public key that uniquely corresponds to wallet addresses on one or more decentralized computing system implementations, which may be implemented with blockchain-based protocols), or information by which the representation or public key may be identified within a database (e.g., of an issuer of the apparatus or other entity). In some cases, the optical code on the concealed surface encodes a representation (e.g., in plain text or ciphertext form) based on or of a private key that corresponds to the public key, e.g., from a key-pair generated with one of the following classes of asymmetric encryption techniques: Diffie-Hellman; Digital Signature Standard; ElGamal; elliptic curve techniques; Rivest-Shamir-Adleman ("RSA"); lattice-based cryptography; and the like.

In some embodiments, digital bearer assets, like tokens (e.g., NFTs) or cryptographic currency, may be transferred (e.g., based on a protocol of a decentralized computing platform) to an account associated with the apparatus based on public access information of the exposed top-component, or otherwise identifying the public access information corresponding to the apparatus within a database (e.g., by association of an identifier on one or more components of the apparatus with the public access information in the database). Thus, for example, while the top-component is in an un-accessed state, digital bearer assets may be transferred to the account without the transferrer viewing or otherwise accessing private access information of the concealed bottom-component. Accordingly, in some examples, digital bearer assets may be transferred to an account associated with an apparatus for maintaining access information prior to a user obtaining the apparatus and without the transferrer (or other entity) having access to private access information disposed on the bottom-component. Later, when a user wishes to access (e.g., transfer to a recipient wallet or address) digital bearer assets held by an account associated with an apparatus for maintaining access information, the exposed top-component may be removed to reveal the concealed bottom-component, which includes the private access information (or portion thereof) operable to transfer those digital assets (e.g., via a protocol of a decentralized computing platform).

In accordance with various embodiments disclosed herein, user experience is drastically simplified over previous implements as a top-component of a multi-component sticker is physically peeled back to reveal a portion of a bottom-component of the multi-component sticker including a secret. Moreover, the secret may be encrypted information that may only be decrypted by accessing an additional secret, like a passphrase (e.g., a symmetric encryption/decryption key), which may be included on a substrate of the apparatus to which the multi-component sticker is affixed. In some examples, the multi-component sticker may be disposed on the substrate to cover the passphrase. And, by virtue of disclosed embodiments of tamper-evident sticker configurations, loss of secrecy is physically apparent by visual inspection with the naked eye. Moreover, there is no need for a user to remember a set of key recovery passphrases, account information, or other information like those often used with traditional approaches. Additionally, in some example embodiments, a user may conveniently transfer a digital bearer asset (or amount thereof) from a first account to a second account, such as by accessing the secret by which the first account is protected and submitting a transaction on a distributed computing platform that specifies a transfer from the first account (e.g., with ownership thereof being verifiable based on possession of the secret) to the second account (e.g., identifiable based on information disposed on the top-component) without any requirement to access the secret by which the second account is protected.

Security concerns may be mitigated in various configurations of an apparatus for maintaining access information that includes a tamper-evident sticker and physical substrate. For example, a top-component of a multi-component sticker may include a hole, channel, or other type of window to an underlying layer, like a bottom-component of the multi-component sticker. Through the window a unique identifier disposed on the underlying layer may be visible upon inspection. A corresponding unique identifier may also be disposed on the top-component and visible upon inspection, the identifier being displayed to permit a user to verify the unique identifier corresponding to the top-component matches the unique identifier of the exposed portion of the bottom-component, thereby ensuring a match of public access information to private access information disposed on the respective components. Another corresponding unique identifier may also be disposed on the substrate and visible upon inspection. The bottom-component of the multi-component sticker also includes content, like private access information, that is concealed by the top-component and not readily visible (e.g., until the top-component is removed to reveal that content on the bottom-component). The substrate, too, may include secret information disposed on a surface thereof, like a passphrase by which encrypted private access information on the bottom component may be decrypted to obtain plaintext private access information. Secret information (in contrast to the unique identifier) disposed on the substrate may be concealed by one or more of the top-component and bottom-component of the multi-component sticker. Matching unique identifiers across the sticker components and the substrate component may ensure informational correspondence across the collection of components of the apparatus.

The top-component of the multi-component sticker may be configured with one or more tamper-evident features, such as one or more tamper-evident layers and an adhesive to promote activation of the tamper-evident features. For example, lifting of the top-component from a surface to which it adheres may promote a tamper-evident effect in a feature which, by visual inspection, a user can ascertain whether the top-component has been lifted to expose at least a corresponding part of an underlaying surface.

In some embodiments, the tamper-evident effect of a feature is selectively promoted based on adhesion strength to what it adheres. For example, a first portion to which the top-component is adhered may be a portion of the substrate (which may be configured to promote adhesion), and a second portion to which the top-component is adhered may be a concealed portion of the bottom-component. In some embodiments, the adhesive adheres with a first strength to the concealed portion and adheres with a second strength to the substrate, the first strength being less than the second strength. Thus, for example, the second adhesion strength promotes activation (e.g., activates) a tamper-evident feature when the top-component is lifted from a surface of the substrate to which it adheres with the second strength. The first strength, however, may not activate any tamper-evident feature of the top-component. Accordingly, a concealed portion of the bottom-component to which the top-component adheres with the first strength may be readily visible after the top-component is lifted.

In some embodiments, the first strength is great enough to activate a first one (or more) tamper-evident feature of the top-component but weak enough to not activate a second one (or more) tamper-evident feature of the top-component. In other words, in some embodiments, the first strength may selectively activate at least a first tamper-evident feature but not at least one other tamper-evident feature. The second strength, by contrast, may activate the first tamper-evident features and the other tamper-evident features that are activated by lifting of the top-component from a surface to which it adheres to with the second strength. In some embodiments, the first strength is weak enough to substantially prevent adhesive residue resulting from the lifting of the top-component from the concealed surface of the bottom-component to remain on the concealed surface of the bottom-component. In some embodiments, the second strength is great enough to activate at least a first tamper-evident feature of the top-component. In some embodiments, the second strength is great enough to activate an at least one other tamper-evident feature not activated at the first strength. In some embodiments, the second strength is great enough to substantially cause adhesive residue to remain adhered to the substrate.

In some embodiments, the concealed portion has printed thereon another optical code encoding a ciphertext, the plaintext of which is a secret key of a key pair. In some embodiments, the ciphertext is generated by encryption of the plaintext with a symmetric encryption protocol using an encryption/decryption key. Thus, for example, the encryption/decryption key is like a passphrase by which encrypted private access information in ciphertext can be decrypted to obtain private access information in plaintext. The substrate may include the encryption key, which may be marked (e.g., engraved) on the substrate. In some embodiments, such as in embodiments where the bottom-component includes ciphertext of plaintext private access information, a unique identifier (e.g., corresponding to a same unique identifier visibly disposed on a top-component and visibly, via a window of the top-component, disposed on the bottom-component) may be similarly marked (e.g., engraved) on the substrate, thereby ensuring a match of the private access information (in ciphertext) to an encryption key (e.g., like a passphrase) disposed on the substrate that is operable to decrypt the ciphertext to generate plaintext private access information. The unique identifier may correspond to a serial number within a namespace of an issuer (or manufacturer) of the apparatus.

In some embodiments, the encryption key (e.g., a passphrase by which the encrypted private access information may be transformed into plaintext) is concealed in a tamper-evident manner, such as by a tamper-evident mask (e.g., like a sticker, which may have multiple layers) concealing the engraving of the encryption key. Some examples of the sticker may include a multi-layer (or multi-component) sticker like that described above and elsewhere herein. For example, the bottom-component of a multi-component sticker may conceal all or some of the passphrase on the substrate, and the bottom-component may need to be removed from the substrate to reveal all or some of the passphrase on the substrate. In some examples, the bottom-component may be sized and disposed on the substrate to cover the entirety of the passphrase. In some examples, the bottom-component may conceal a first portion of the passphrase (which may also be covered by the top-component), and a top-component may conceal a second portion of the passphrase not concealed by the bottom-component. In some examples, a third portion of the passphrase may not be concealed by either component. In some examples, an additional component, layer, or mask may conceal the passphrase and the bottom-component of the sticker may fully or partially encapsulate that component, layer, or mask.

Example embodiments of a tamper-evident mask may include one or more layers that are peeled-off to reveal, with a tamper-evident effect, the underlying encryption key on the substrate, thus visibly indicating to a user upon inspection whether the encryption key has been accessed by another party. In some embodiments, the encryption key is operable to decrypt the ciphertext by a corresponding symmetric decryption protocol to reveal the plaintext of the secret key of the keypair. Thus, in some example embodiments, a user must activate at least one tamper-evident feature corresponding to a portion of a tamper-evident top-component of the sticker to reveal the ciphertext and activate at least one tamper-evident feature corresponding to a portion of the tamper-evident mask to reveal the encryption key by which the user can ascertain the private access information (e.g., a secret key) in plaintext. Additional example embodiments of a tamper-evident mask may include a layer that is scratched-off, such as to reveal information concealed by the scratch-off layer.

Further, in some embodiments, a physical product for storing digital bearer assets is robust to supply chain attacks. In some embodiments, a manufacturer of a tamper-evident sticker, like a tamper-evident multi-component sticker having a top-component including public access information and a bottom-component including private access information concealed by the top-component, may be restricted from access to the plaintext of the private key. Specifically, because an encrypted representation of the private access information may be supplied to the manufacturer of the tamper-evident sticker, and not the private key (or the encryption key by which the private key can be obtained in plaintext), the manufacturer does not have access (nor does it require access) to the private key in plaintext. Similarly, a manufacturer of a substrate, like a card (or card blank), that is different from the manufacturer of the tamper-evident sticker, is restricted from the access to the encrypted representation of the private access information. The manufacturer of the substrate may receive the encryption key by which the encrypted representation of the private access information may be decrypted and does not have access (nor does it require access) to the encrypted representation of the private access information.

In other words, having access to a ciphertext representation of a private key or the corresponding encryption key alone is insufficient to obtain (e.g., access) the private key in plaintext. Moreover, the manufacturer of the sticker need not take possession of a substrate corresponding to a sticker, let alone a substrate after it is marked with a symmetric encryption key (e.g., a passphrase) needed to decrypt the ciphertext of the private key that is included on the bottom-component. Accordingly, the manufacturer of the sticker cannot ascertain the private access information corresponding to the public access information (or even the public key when a cryptographic hash address or other identifier is supplied as public access information). Similarly, a substrate manufacturer need not take possession of stickers and is therefore prevented from utilizing any encryption key in a nefarious manner In some embodiments, security may be increased by a final engraving step performed by the apparatus issuer (or even another party subsequent to application of a sticker to a substrate) rather than the substrate manufacturer. Thus, for example, in some embodiments, even collusion between both a sticker manufacturer and a substrate manufacturer may be insufficient to nefariously obtain a secret key by which permission to access an account is governed in accordance with a protocol of a decentralized computing platform. Moreover, private keys, ciphertext of private keys, and encryption keys (e.g., passphrases) may be maintained separately and discarded, in some cases in stages, to prevent exposure of combinations of data that a nefarious party could utilize to infer private access information (e.g., a plaintext private key).

In some embodiments, a physical substrate may include a corresponding unique identifier, which may be marked (e.g., engraved) on the metal substrate, the identifier being displayed to permit a user to verify the unique identifier of the card matches the unique identifiers of both components of a multi-component sticker. Further, an issuer of the apparatus (or other party) may utilize the identifiers to match a sticker with a corresponding substrate, which, in some embodiments, may match up deterministic information. For example, in some embodiments, a public key deterministically resolves to a set of wallet addresses, each of which may corresponding to different decentralized computing platforms from which funds can be withdrawn given a corresponding private key. Once an entity derives an address (or set of addresses) to support use of the apparatus, the public key may be optionally discarded (in addition to the private key and encryption key) and a unique identifier (e.g., account identifier) corresponding to an optical code disposed on a component of the multi-component sticker may be associated with the address (or the set of addresses) in a database. In some examples, the unique account identifier may be an address in the set of addresses and may be associated with the other addresses in the set within a database.

In some embodiments, an apparatus may have disposed thereon information by which a user can verify authenticity of the apparatus or other information disposed thereon. For example, in some embodiments, an issuer (or other entity) may maintain a database and provide an interface by which a user who obtains an issued apparatus may verify authenticity of the apparatus by confirming via the database that a portion of the encryption key (e.g., a symmetric key utilized to encrypt a private key), or passphrase, matches the unique identifier corresponding to the card or the multi-component sticker. As described above, in some embodiments, a unique identifier may be visible on at least two components of the multi-component sticker and further visible on the substrate, mitigating the risk of counterfeit articles with less robust security features (or configured to divert digital bearer asset transfers to a cryptographic hash address that a nefarious party controls). In some embodiments, verification does not rely on the entire encryption key, but rather a portion thereof to preserve the remaining portion as an additional form of tamper-evidence that remains intact until access of digital bearer assets is desired.

Embodiments of a physical apparatus for storing digital bearer assets may be both robust and affordable so that users or issuers can budget by allocating different digital bearer assets or amounts thereof to different disposable apparatuses, and upon withdrawal of at least some funds, the remainder can be migrated to a new cryptographic hash address or different cryptographic hash addresses in a set of cryptographic hash addresses (e.g., a wallet) corresponding to a new, physical apparatus. In many use cases, such as in the case of promotional materials, a disposable or recyclable material like plastic or card stock may be used for construction of physical apparatuses. In such cases, users may be expected to redeem or otherwise use the apparatus (e.g., by obtaining the private access information) within a relatively short period of time. However, in some embodiments, an apparatus made of metal or that includes a metal backing, or metal insert, or metal face or rear, or other material that impedes attacks by which scanning equipment is used to try to image information otherwise concealed by tamper-evident material may be desirable. In some embodiments, one or more stickers disposed on a substrate as described herein include metal flakes, inserts, or other material that similarly impedes such attacks. Some example use cases may include an apparatus issued as a certificate of authenticity in association with a product, and an indication of ownership of the product may be predicated upon the current owner accessing the private access information to register the product (e.g., with the manufacturer of the product)—and verification (e.g., without requirement of accessing the private access information) may indicate whether the product is authentic. In some cases, a pair of apparatuses may be issued with a product to permit a user to record an indication of a transfer of ownership of the product to another user, such as by a transaction from one apparatus holding an indication of the product, like a token corresponding to the product, such as a NFT, to the other apparatus (and the manufacturer may sell or provide replacements to facilitate a subsequent transfer).

Figure 2:
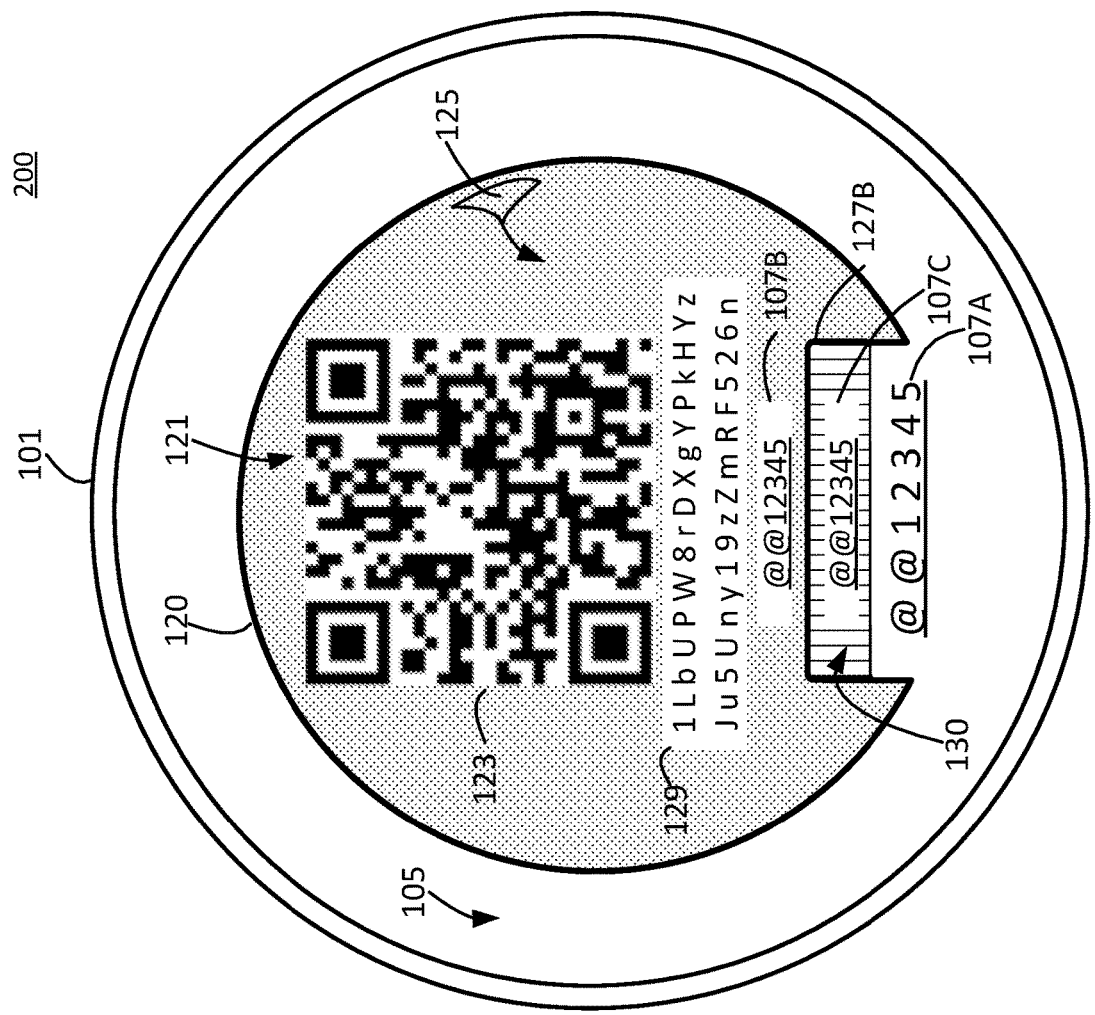

FIG. 1 and FIG. 2 illustrate examples of a substrate and multi-layer sticker apparatus including example tamper-evident features and verification features, according to some embodiments. Example apparatuses described with reference to FIGS. 1 and 2 may be physical apparatuses, like a card or a chip, and include various ones of the technologies described herein. For example, a chip may include one or more tamper-evident features by which a user of the chip can verify, upon inspection of the chip, that private access information of the chip has not been divulged to another party. While examples of chips are depicted within the figures, embodiments should not be construed as limited to only those form factors depicted, as other form factors like cards are not disclaimed.

FIG. 1 illustrates an example 100 of a physical chip configured to manage account access information for digital bearer assets, according to various embodiments. An example of a chip may include a round substrate having dimensions similar to a casino chip or token, challenge coin, or physical currency coin (e.g., like a quarter, half dollar, silver dollar etc.). Round substrates may have a construction similar to those of card-like counterparts, for example, they may be a plastic, metal, or other rigid, semi-rigid, flexible, or semi-flexible material, having a given form factor. Example form factors may range from approximately 19 mm (—0.75 inches) to 100 mm (~4 inches) in diameter, like 25 mm (~1 inches) to 54 mm (~2 and ⅛ inches), although other smaller or larger form factors may be used. Example chips may have rounded edges, an example radius of which may be approximately 2.88-3.48 mm Example chips may have a thickness of between 0.1 and 5 mm, depending on a desired weight, stiffness, or other property based on the material and use case. Described dimensions may be varied plus-or-minus 10% or plus-or-minus 20%, in addition to other expressed ranges.

The chip 101 may comprise a substrate 105 having dimensions like those mentioned above and which may be wholly or partially constructed out of a material such as metal or plastic. For example, the substrate may be wholly metal, wholly plastic, a combination thereof (e.g., like one layer of metal of at least ⅓ the thickness of the chip, such as a 0.20-0.25 mm metal layer, and one or two other layers of plastic that make up the other ⅔ of the thickness of chip), or other material (e.g., like a paper product). In some embodiments, the substrate 105 has a construction permitting printing, laser engraving, etching, or other disposition of information or images on front or back surfaces of a chip blank. In some examples, a unique identifier 107A may be disposed on a face of the substrate 105. Other information may also be disposed on a face of the substrate 105, such as a passphrase, like an encryption key (not shown), by which one or more ciphertexts corresponding to the chip may be decrypted. In some embodiments, the passphrase may be concealed by a mask, such as one or more layers of a sticker (e.g., sticker 120), subsequent to disposition of the passphrase information on the substrate 105. Thus, a component of private access information, such as a passphrase by which encrypted private access information may be processed (e.g., decrypted) to obtain private access information in plaintext may be disposed on the substrate 105 of the chip 101.

Examples of plastics suitable for construction of a substrate 105 may include one or more of polyvinyl chloride (PVC) having a density of approximately 1.3-1.5 g/cm3, acrylonitrile butadiene styrene (ABS) having a density of approximately 1-1.1 g/cm3, polyethylene terephthalate (PET) or glycol modified PET (PET-G) having a density of approximately 1.3-1.46 g/cm3, poly(lactic acid) (PLA) having a density of approximately 1.2-1.45 g/cm3, or other suitable plastic material, which may include but is not limited to various thermoplastics.

Examples of metals suitable for construction of a substrate 105 may include one or more of Titanium, having a density of 4.506 g/cm3 or Aluminum, having a density of 2.7 g/cm3. Other example metals may be an alloy, such as an aluminum alloy, like 6061 Aluminum having a density of approximately 2.7 g/cm3 or 7075 Aluminum having a density of approximately 2.81 g/cm3. Steel (e.g., stainless 304, 409, 630 etc.) and titanium (e.g., Ti6AI4V, TI 6-4, etc.) as well as other metal alloys are also applicable.

Other example materials suitable for construction of a substrate 105 may include combinations of one or more of the above materials, like one or more layers of a metal or a plastic, or plastic including metal flakes, or another material (e.g., poster or card stock, paper materials, fiber-based, etc.) to which a sticker can adhere. Other information may be disposed on a substrate 105 in different ways, such as by printing, etching, embossing, another sticker, or other suitable method.

In some embodiments, one or more materials used for a substrate 105 of a chip, like for a chip blank, may be selected based on one or more properties of a sticker 120, or properties of the sticker are selected based on the materials used for the chip blank. For example, in some embodiments, a metal or metal impregnated material may obfuscate private access information disposed on the sticker against scanning or other imaging attacks. In some examples, one or more layers of the sticker (above the private access information) may include reflective metal imbedded therein, and that metal may be selected based on the material of the substrate or vice versa. Similarly, a layer of the sticker (or below the private access information) may include reflective metal imbedded therein of a different or same type as the top layer. In some examples, one or more layers of the sticker (above or below the private access information) may include reflective metal imbedded therein and may be selected based on the construction of the substrate or vice versa. The one or more layers of the sticker including metal imbedded therein in conjunction with the material selected for the substrate 105 may substantially obfuscate private access information when subjected to non-destructive attacks (e.g., scanning) A material of a substrate 105 may also be of a metal construction or plastic including metal imbedded therein to obfuscate private access information in connection with or in place of one or more of the layers of the sticker. In other words, the configuration of the substrate 105 and sticker (discussed in more detail below) may be such that a user (nefarious or otherwise) is required to activate one or more tamper-evident features of the chip to obtain private access information, which thereby indicates to other users that the private access information is no longer private.

In some embodiments, different layers of a sticker 120 may have different sizes, for example, a first layer or first set of layers may have first dimensions (e.g., size) of length, width, radius, etc. that, when applied, correspond to a first area having similar dimensions or size (e.g., when applied to a face of a physical substrate). In some embodiments, a second layer or second set of layers may have second dements (e.g., size) of length, width, radius, etc., that, when applied, correspond to a second area having similar dimension or size (e.g., when applied to the face of the physical substrate). The dimensions of the second layer or second set of layers may be configured such that they extend beyond the dimensions of the first set of layers, such as beyond at least a portion of the perimeter of the first set of layers, like 60-90%, or even 100%, to encapsulate (e.g., envelope, cover, hide, enclose, or otherwise conceal) an area (e.g., having dimensions corresponding to the private access information) of the first set of layers.

In some embodiments, a window portion is formed in the second layer or second set of layers, through which a subset of information disposed on a first layer or first set of layers may be visible via the window portion (e.g., whether through a window cutout, cutout window notch, or transparent window or transparent window notch). In some embodiments, the information visible within the window portion corresponds to an identifier (or other public access information component) disposed on a portion of the first layer (e.g., within an area having dimensions corresponding to the window) or the first set of layers. However, in some embodiments, the first layer or first set of layers may include a tab-like extension including the public access information that is configured to extend beyond the perimeter of the second layer or second set of layers without any physical windowing of the second layer or second set of layers. Different layers may be comprised of different materials, like different films or disposed materials whether coating or adhesive, and the thickness (or depth normal to a surface) of different layers may vary based on the thickness of the film or disposed coating or adhesive.

In some embodiments, a swatch having dimensions approximate to the dimensions of a sticker 120 may be disposed into a front face of the chip 101. For example, a swatch may be laser engraved in a face of a metal or plastic chip, or otherwise applied to the face of the chip (e.g., by other means to apply the swatch, by material selection, or otherwise) in a location where the sticker 120 is to be applied. The swatch area may have a root-mean-squared surface roughness greater than non-swatch areas to promote adhesion of an adhesive, like an adhesive layer or disposed adhesive glue. For example, a surface roughness as measured by a profilometer within a swatch area may be 50% higher than other parts having a smoother finish. The above configuration of the swatch should not be construed as being limited to a specific area or dimension (e.g., size) of a face of the chip 101 may substantially correspond to the dimensions of a swatch (e.g., a face may be wholly or substantially configured like a swatch). For example, a metal substrate 105 may be manufactured with a rough-cut finish, anodized or otherwise chemically etched to include a rough (like a matte finish) rather than a polished finish, or a plastic substrate 105 may be manufactured with a mold having a textured portion in inverse profile to the swatch formed on the chip, stamped or embossed into the chip, or other suitable method. In other words, there is no requirement for a swatch-like surface to be localized to where the sticker is applied. The swatch may be a pattern (or surface type, like a matte finish whether laser engraved, chemically etched, coated, molded, stamped, embossed, or otherwise so manufactured to include a surface type or pattern other than a smooth or polished surface) of a shallow depth to promote adhesion by an adhesive (e.g., an adhesive layer backing a sticker 120) relative to a smooth surface. For example, a sticker 120 having an adhesive layer backing the sticker may be applied to the substrate 105, and the adhesive of the sticker may substantially contact the swatch. In some embodiments, the depth of the pattern of the swatch relative to the face is less than 0.05 mm, and may be approximately 0.005-0.010 mm in depth.

As described above, information may be disposed on a surface of the substrate 105. Various ones of the methods described above for generating a swatch may be suitable to dispose information on a surface of a substrate 105 of a chip or card, among others. For example, information may be printed, laser engraved, stamped or embossed, or otherwise disposed on the surface. Examples of information may include a unique identifier 107A, an encryption key (e.g., covered by a mask, examples of which include a sticker), or other information as described herein. For example, a unique identifier 107A may be engraved or stamped to a depth less than 0.20 mm, like 0.02-0.15 mm, or approximately 0.07-0.08 mm in some embodiments. In some embodiments, the depth of the engraving or stamping of the encryption key may be shallower than the unique identifier, but may be of a larger font, the depth selected to afford readability but mitigate applicability of some scanning or other tampering (e.g., like pressing of the mask into the etching to ascertain the key). In some embodiments, the depth of the encryption key etching is approximately 0.02-0.04 mm, although other embodiments may utilize a same depth as the unique identifier 107A. In other embodiments, the encryption key, among other information, like the unique identifier, may be printed on the chip. The mask may encapsulate (e.g., envelope, cover, hide, enclose, or otherwise conceal) the encryption key disposed on the surface of the chip and may include one or more tamper-evident features by which a user may determine whether the encryption key is in an accessed state (or not in an accessed state).

In some embodiments, the physical chip 101 includes, adhered to the chip blank 105 (which may be engraved to include a unique identifier 107A and other information described herein), a tamper-evident sticker 120, like a multi-layer sticker with at least two physical component layers, and each component layer may include one or more layers. For example, a tamper-evident sticker 120 may include two component layers, or components, and each component may have one or more layers. In some embodiments, at least one component, like a bottom-component, is partially concealed by a top-component. For example, a bottom-component may include private access information printed thereon that is concealed by the top-component. At least the top-component may include one or more tamper-evident features such that by visual inspection a user can easily determine whether private access information disposed on the bottom-component has been accessed (e.g., divulged) or is secure (e.g., has not been divulged). For example, a tamper evident pattern may appear within at least a portion of a component when that component is lifted away (e.g., such as to view concealed information) from a surface it adheres to with a threshold strength, like a swatch area of a substrate 105.

As shown, a sticker 120 is applied to a face of the substrate 105 of the chip 101, such as a front or rear face. As described above, in some embodiments, the sticker 120 may be applied in the location of a swatch on a face of the substrate 105. The swatch may promote adhesion of an adhesive of the sticker 120 with the material of a face of the chip 101 (e.g., a metal, plastic, composite, etc. as described above). Embodiments of the sticker 120 may comprise one or more tamper-evident features, at least one of which may be activated when a portion of the sticker 120 adhering to a face of the chip 101 is lifted from the face of the chip. For example, the sticker 120 may include a component 121 within which a tamper-evident pattern appears when the component 121 is lifted 125 from a surface (e.g., a face of the chip) to which it adheres, and the configuration of the swatch may promote appearance of the tamper-evident pattern via the adhesive strongly adhering to the swatch. In some embodiments, the tamper-evident pattern is configured such that the appearance of the sticker 120 cannot be returned to an original appearance subsequent to a lifting 125 of a respective area of the component 121 from a face of the chip blank 105 to which it was adhered. In some embodiments, the component 121 may be configured such that at least one layer (e.g., an upper layer) remains relatively intact with a tamper-evident pattern being revealed therein by virtue of underlaying destruction promoted by the adhesive in a lower layer of the component when lifted 125 from a surface of the chip blank 105. In some embodiments, the component 121 may be configured such that a plurality of layers through a cross section of the component are destroyed in at least some portion of the component when lifted 125 from a surface of the chip blank 105. In some embodiments, the above aspects are combined, for example, a first portion of the component 121 may easily tear when lifted 125 and another portion may not easily tear, but a tamper-evident pattern is revealed in the other portion when lifted 125.

In some embodiments, as described above, component 121 is configured to reveal a tamper-evident pattern when a corresponding portion of the component is lifted 125 from a surface to which it adheres with sufficient strength. For example, in some embodiments, the surface (e.g., the swatch, material of the substrate 105, or combination thereof) to which at least some portions component 121 adhere to causes the revealing of the tamper-evident pattern by promoting adhesion of sufficient strength to reveal the pattern. Note that this does not necessarily mean that the component 121 is difficult to lift from the substrate 105, but rather that the component is difficult to remove without evidence of tampering. For example, an adhesive utilized in the component 121 may be colored (e.g., silver) and pull away from the component lifted, thereby revealing the pattern. Several non-limiting examples of a component 121 of a sticker 120 may include one or more features outlined below:

An example component may include one or more layers, such as one, two, three, four, or more layers. At least one layer of a component, such as a bottom layer, may include an adhesive operable to adhere to at least one surface, like a surface of a chip or card or other physical object. In some embodiments, the adhesive may be an adhesive layer applied to a sticker-roll in a manufacturing process and subsequent layers are added thereto to construct a multi-layer component. In some embodiments, the adhesive may be applied to a layer, which is then applied to a sticker-roll, and other layers are added thereto to construct a multi-layer component. In either instance, at least one layer, like a bottom layer of a component, may include an adhesive, such that the component may be attached to a surface. In some embodiments, the adhesive may be applied to a surface to which the component is attached, such as a surface of a face of a physical chip, and one or more layers or components are adhered thereto by the adhesive disposed on the surface. Examples of adhesives may include glues, like an oil-based glue, or other suitable glues, examples of which may include an organic (e.g., oil), water, or other solvent base, which is mixed with a corresponding adhesive to create an adhesive solution for application. For example, a polymer (whether synthetic or natural) or resin adhesive may be dissolved in a corresponding solvent base for a given application. In some embodiments, an adhesive layer comprises a tamper-evident structure, which may be formed in the adhesive layer, or created in the layer by an overlaying film. In some embodiments, the adhesive layer is a film of adhesive, which may have selectively applied a pattern to cause different binding strength to a surface or film layer of a component in contact with the adhesive.

In some embodiments, a layer is polymer film, such as a polypropylene (PP) or polyester (PET) film, like an oriented film, which may be biaxially oriented. Orientation of a film may thin a starting film proportionally to the orientation, which may also be referred to as a stretch ratio. For example, to get to a 1 mil (where 1 mil=1/1000 of an inch, or 0.0254 mm) finished film with 5:1 stretch ratio in a first direction (e.g., lengthwise), a 5 mil film of polymer may be stretched proportionally (e.g., to approximately 5 times the starting length) in the first direction. For a biaxially oriented film, to get to a 1-mil finished film with 5:1 stretch ratio, a 25 mil film may be stretched proportionally in a first direction and a second direction (e.g., both lengthwise and widthwise by approximately 5 times the starting length and width). Thus, for example, in some cases a layer may be a biaxially oriented polypropylene (BOPP) or biaxially oriented polyester (BOPET) film, which may have a width of more than 100 inches, or more than 300 inches, and be many times longer in length, such as at least the length of a roll on which the stickers are manufactured. In some cases, one layer may be a PET or BOPET layer, and another layer may be a PP or BOPP layer. Accordingly, when a layer is described as a PET layer, such as a layer formed by a PET film, it should be understood that the layer may be formed from a PET film (e.g., which may be unstretched or is stretched in one dimension relative to a base PET film) or BOPET film (e.g., which is stretched in two dimensions relative to a base PET film) unless otherwise stated; and when a layer is described as a PP layer, such as a layer formed from a PP film (e.g., which may be unstretched or is stretched in one dimension relative to a base PP film) or BOPP film (e.g., which is stretched in two dimensions relative to a base PP film) unless otherwise stated. Further, in some embodiments, a PP film or PET film may be substituted with a polyethylene (PE) or other applicable film.

In some embodiments, a film is metallized. In some embodiments, multiple layers of film are utilized, some of which may be different films (e.g., a PP film for one layer and a PET film for another layer) to obtain different features or properties in a component. For example, a PP or PET film may be vacuum-metallized (e.g., like vapor deposition) or imbedded with metal flakes. In some embodiments, a vacuum-metallization process may be utilized to increase resistance to moisture intrusion. In some embodiments, a fragrance or other compound may be disposed (e.g., by a vacuum process) in a film, such as within a PP film, whereby scratching that film when it is utilized as a top layer releases (or exposes) at least some of fragrance or compound to increase perception of the scent. In some embodiments, thickness of a film ranges from 0.3-1.5 mils, but other thicknesses may be utilized. In some embodiments, for a same thickness, a PET film is less flexible than a PP film, and as a result, a PET film may afford greater stability than a PP film in printing. Accordingly, in some embodiments, at least one PET film is utilized for a component in at least one layer prior to a printing of information (e.g., an optical code, text, graphics, etc. as described herein), like in a lower layer of a component, on which the information is printed and another layer of film (e.g., PP or PET) is subsequently applied after the printing of the information. Thus, for example, an adhesive layer (which may have an adhesive structure, such as to reveal a pattern) may be formed, or applied to a lower PET layer, on which information is printed, and a subsequent upper layer may be applied to protect the lower PET layer (e.g., to protect the information printed on the lower layer). For example, in some embodiments, an upper layer of a component may be a PET layer, or in some embodiments, an upper layer of a component may be a PP layer.

In some embodiments, such as those that include a sticker with multiple layers, like a multi-component sticker, a bottom-component comprising private access information may include a lower PET layer (e.g., for printing and durability) and an upper PET layer (e.g., for durability), and a top-component comprising public access information may include a lower PET layer (e.g., for printing and durability) and an upper PP layer (e.g., for impregnation of a fragrance or metal for enhanced moisture resistance or resistance to scanning). Thus, as outlined herein, various combinations of films and technologies may be utilized in different layers to obtain different component configurations for the different components of a multi-component sticker. For example, moisture, oxygen, ultraviolet, heat, and other environmental resistance properties of films may be considered to afford a desired configuration of layers in a component. Further, for example, strength and durability of a film or layer of material, whether by virtue of the material or construction of the film or layer (e.g., PP, or PET, or PE, or other compound and whether stretched in a single direction or biaxially stretched), may be considered to afford a desired configuration, such as whether a given layer should peel away cleanly, break apart, or otherwise interact in combination with an adhesive to afford tamper-evidence. Example beneficial properties of a PET film, such as a BOPET film, may include dimensional stability, thickness uniformity, and transparency; and example beneficial properties of a PP film, such as a BOPP film may include transparency and moisture barrier.

Example films and technologies consistent with the disclosure of components and layers thereof for utilization in a multi-component sticker may include, in addition to the examples described above, one or more upper-layer films or substrates (e.g., PET type films and substrates like a chrome polyester or polyethylene terephthalate polyester, PP type films and substrates, vinyl films and substrates, ceramic films and substrates, or other films or substrates, which may be optionally embedded with chrome or a metal (e.g., metallized) to mitigate certain scanning or imaging techniques for determining information of the concealed portion or embedded with a fragrance by which users may ascertain authenticity) and an underlying-layer film or substrate (e.g., one of the above mentioned films or substrates or an adhesive film or substrate) having an adhesive pattern portion (which may be an adhesive layer to which the underlying-layer is applied, or an adhesive applied to the underlying-layer, or inherent to the underlaying-layer or promoted in the underlaying layer or in the adhesive layer whether by laser, cutting, or other applicable process), like a diamond, hexagonal, or square checkerboard-like pattern. In various embodiments, the adhesive pattern portion of an underlaying-layer is such that when a substrate top-coated portion of the substrate is peeled away, the pattern portion underneath remains. In turn, the sticker 120 cannot be resealed or reused to original appearance, thus being evident of tampering should a user attempt to ascertain the information on the concealed layer of the sticker 120.

In some embodiments, a component includes a destructive layer of a PP, PET, or vinyl film or substrate that rips and tears apart easily (e.g., inherent to the substrate or by manufacturing process, such as via perforations or cuts in the substrate to promote tearing), and once adhesively applied to a surface is destructible in the sense that it cannot be removed in one piece. For example, a strong adhesive utilized in conjunction with the destructive layer may cause the substrate to easily-fragment material and means that it is difficult to remove the layer (e.g., from the swatch portion without leaving pieces behind, however it may remove easily without tearing from some other surface, like that of a bottom component). In turn, such a top-component of a sticker 120 cannot be returned to original appearance (e.g., for resale, resealing, or reuse), thus being evident of tampering should a user attempt to ascertain the information on a concealed, bottom-component of the sticker 120 or information that is otherwise concealed by the top-component. In some embodiments, an adhesive layer comprises similar properties, such as a pattern promoted in the layer, and some of the pattern peels up with an underlaying layer and some remains adhered to the surface to which the component was applied. In some embodiments, a component includes a layer of a PP, PET, or vinyl film or substrate that contains a concentration of light-refracting elements to increase difficulty to forge, scan, or reproduce the component. In some embodiments, a component includes a foil film or substrate (which may be a metallized film or a foil), like a holographic foil or film, having a prismatic effect and pattern that deters forgery or duplication.

In some embodiments, a component includes one or more relatively transparent portions of one or more layers such that an adhesive or adhesive residue, which may be colored, and configured to reveal a pattern when the component is lifted from the surface the adhesive adheres the component to that is then visible in corresponding transparent portion. A transparent or relatively transparent portion enables a user to discern at least some information through (e.g., information that underlays) the material, such as by visual identification, like a pattern being visible at 1-3 feet or underlying text of 8-12 pt font being readable at 1-2 ft. For example, a residue of an adhesive layer or adhesive utilized for a layer may cause, within the transparent portions of one or more other layers of a component, a highly visible pattern of shapes (e.g., in a checkerboard-like pattern) to be left behind when the component is lifted from a surface to which it adheres (e.g., with sufficient strength, like to a material of the chip, but may adhere to some other surface, like that of a bottom component, within which that portion a pattern may not be revealed—which in some instances may readily convey that a top component was lifted due to some portions including a pattern but not others). Such an adhesive may be colored, such that the shapes are visibly identifiable. As described above, some relatively transparent portions (e.g., with none to minimal printing within those areas) may be utilized in conjunction with an adhesive like that described above such that shapes (or pattern, or in other embodiments, tears in one or more layers, like underlaying layers) are at least partially visible on the component when it is lifted away from a surface. In some embodiments, the portions not corresponding to the shapes (or pattern, or in other embodiments, tears in one or more layers) lifted away with the component remain on the surface to which the component was adhered to such that removal of the component is tamper evident on both the component and the surface to which it was applied. In some embodiments, the adhesive or a layer of the component stretches (e.g., in the pattern or shapes), tears, or otherwise is at least partially altered (e.g., destroyed) visibly in the component or on a surface to which the component adheres when the component is lifted from surface such that an attempt of a matching of tamper-evident features visible in the component (or portion thereof) that was lifted from the surface back to the corresponding tamper-evident features visible on the surface (e.g., in an attempt to reposition and re-lay or adhere the component (or portion thereof) back to the surface) does not return the component to an original state upon visible inspection. For example, there may be gaps or other visible tamper-evident features (compared to a uniform appearance in an unaltered state) that betray an attempt to replace the component subsequent to tampering. Accordingly, in some embodiments, a component of a sticker 120 cannot be returned to original appearance after application to a surface (e.g., like that of disclosed embodiments of a chip or other material), thus being evident of tampering should a user attempt to ascertain information, like private access information, concealed by that component.

Further, in some embodiments, a component of a sticker 120 may include, in addition to at least one tamper-evident feature, a EURion constellation, or other pattern configured to cause imaging software to detect the presence of a component of the sticker 120 in a digital image. In some embodiments, where the sticker is a multi-component sticker 120, one or more components (with or without a tamper-evident feature) may include a EURion constellation, or other pattern configured to cause imaging software to detect the presence of a component of the sticker. Such software may block a user from reproducing the sticker 120 or a component thereof. For example, the EURion constellation or other pattern may be printed on the component 121 along with other information when generating the sticker 120. Similarly, the EURion constellation or other pattern may be printed on another component, like an undelaying bottom-component 130 (which may also be a second, underlying sticker), of a multi-component sticker 120 in addition to a top-component 121.

One or more of the above-mentioned configurations may be used alone or in combination to construct a sticker 120. In some embodiments, as mentioned above, the sticker 120 may be a multi-component sticker and one or more of the above-mentioned configurations may be used alone or in combination to construct a given component of a multi-component sticker. The different components may be constructed separately (e.g., as individual stickers) and merged together prior to application or applied in sequence to form a multi-component sticker 120. Alternatively, in some embodiments, a multi-component 120 sticker may be formed by constructing a first underlaying bottom-component (which may include one or more layers) and constructing a second overlaying top-component (of one or more additional layers) thereupon. Regardless of the specific construction method, embodiments may utilize a different configuration for different ones of the components to construct a multi-component sticker. Thus, generally, as referred to herein, a given component may have a relatively discrete function (e.g., include some component specific information and one or more features selected from tamper-evident features, features to mitigate scanning attacks, or features to prevent reproduction depending on function) compared to another component.

In some embodiments, at least some information disposed on a substrate of a chip, such as information (like a passphrase) corresponding to private access information, may be masked. A mask, like a component 121 of sticker 120, may include one or more tamper-evident features. For example, a mask may have one or more layers having a similar configuration to a component 121. In some embodiments, the mask is a sticker having dimensions (like a length and width) operable to encapsulate (e.g., envelope, cover, hide, enclose, or otherwise conceal) an area of the substrate 105 of the chip 101 on which the information corresponding to private access information is disposed, like an area within which an encryption key or passphrase operable to obtain private access information (e.g., in plaintext) is engraved or otherwise disposed on the substrate. In some embodiments, one or more components or layers of a sticker 120 mask the private access information disposed on the substrate 105 of the chip 101. For example, embodiments of a mask may include a layer having a similar construction by which a tamper-evident pattern appears within a component of the mask to provide a tamper-evident masking that conceals an encryption key disposed on the substrate 105. In some embodiments the mask may include both tamper-evident features, such as by a multi-component mask having a top-component which when lifted a pattern is revealed and includes a window to a bottom-component having a scratch-off surface by which the concealed encryption key may be revealed, and the top-component may surround the bottom-component with some overlap (e.g., a first portion of the top-component, such as around the window, overlaps with the bottom-component and a second portion adheres to the substrate 105). In some embodiments, the mask includes a component having a scratch-off surface layer by which a concealed encryption/decryption key, or a passphrase, may be revealed. For example, the component may include multiple layers, like an adhesive layer, an underlaying layer and a scratch-off layer or scratch-off material disposed on the underlying layer. In some cases, the adhesive and underlaying layer may be transparent such that removal of the scratch-off material reveals the information concealed under the mask. In some embodiments, the component of the mask comprises a destructive tamper-evident feature in addition to a scratch-off top layer to prevent a bypassing of the act of scratching off the material to reveal the concealed information. For example, one or more layers of the component of the mask may be perforated or cut to promote tearing when lifted.

As described above, in some embodiments, the tamper-evident sticker 120 includes at least two physical components, one of which is partially concealed by the other. A top, exposed component 121 may include an optical code (e.g., a QR code) portion 123. In some embodiments, the optical code portion 123 includes an optical code printed within the portion that encodes an address corresponding to a public key of a public-private key pair of an asymmetric encryption algorithm. In some embodiments, an optical code printed within the portion may encode the public key (e.g., instead of or in addition to a corresponding address). In some embodiments, the optical code portion 123 includes an optical code printed within the portion that encodes an identifier that is associated with an address (e.g., that corresponds to a public key of a public-private key pair) within a database. In some embodiments, the optical code portion 123 includes an optical code printed within the portion that encodes a URL (e.g., web address), which may include a portion of the URL that is based on one or more informational components of the chip. For example, an encoded URL may have a form similar to www.website.com/<alphanumeric string>, where the alphanumeric string corresponds to, or is based on, information like a public address, public key, or identifier associated with the chip, and in some examples may be based on multiple identifiers. In turn, the webpage to which the URL directs may include information corresponding to the chip (e.g., for one or more wallet addresses associated with the chip), like a depiction of the chip, balance information corresponding to one or more wallet addresses of the chip, and (optionally) address information for wallet addresses of the chip. A server, for example, may generate or populate graphical and informational components within the webpage responsive to the alphanumeric string, which may be used by the server to identify chip record information.

Printing of an optical code within the optical code portion 123 may occur on a component 121 of the sticker 120, such as a top-component visible to a user. In some embodiments, the exposed top-component 121 of the sticker 120 may include an alpha-numeric portion 129. The alpha numeric portion 129 may include information printed thereon that corresponds to some or all of the information encoded by an optical code within the optical code portion 123. For example, a QR code printed within the optical code portion 123 may be an encoded version of an alphanumeric string printed within the alphanumeric portion 129. In another example, the QR code portion 123 may encode information (which in some examples may be a link, like a URL, to access information) associated with an alphanumeric string printed within the alphanumeric portion 129. In some examples, the optical code portion 123 may encode a URL comprising an alphanumeric string such that users may use a device, like a mobile phone, to scan the optical code to cause the device to request a webpage corresponding to the URL to view information about the chip (or sticker). Examples of a webpage corresponding to the URL may include information like one or more addresses corresponding to respective digital wallets on different distributed computing platforms, information about digital bearer assets like cryptographic currency or NFTs held by respective ones of the digital wallets, a public key corresponding to the digital wallets, unique identifier of the chip (or sticker), or other information about the chip (or sticker) (except, for example, a private key and passphrase). In some embodiments, one or both of the optical code portion and the alphanumeric portion may be an address corresponding to a public key of a public-private key pair. In some embodiments, the optical code portion 123 may be an encoded address, which in some examples may be an encoding of a URL including or based on an address of a digital wallet or other identifier information by which a webpage corresponding to the chip (or sticker) may be identified or generated (e.g., based on the included information) by a server system (e.g., to provide information about a set of digital wallets), and the alphanumeric portion 129 an address of one of the digital wallets in the set) public key or address (of one of the digital wallets) in plaintext. In some embodiments, the optical code portion 123 may be an encoded unique identifier, which in some examples may be an encoding of a URL including or based on the unique identifier, other identifier or informational component or combination thereof, that uniquely corresponds to the chip but is not a cryptographic hash address operable on a decentralized computing platform that is based on the public key. A URL (or part thereof, like a unique identifier, wallet address, or unique value based thereon), may be associated, server-side, such as within a database, with one or more cryptographic hash addresses (e.g., a set of address corresponding to a set of respective digital wallets) or the public key. Thus, for example, a URL may be used to convey to a server-system a unique identifier, like a record identifier operable within the context of the server-system supporting the chip, rather than a cryptographic hash address itself (or a public key from which cryptographic hash addresses may be deterministically generated). In some examples, a unique identifier may be based on the public key but is not generated in accordance with a protocol of a decentralized computing platform for deterministically generating a cryptographic hash address operable on the platform. In some examples, the unique identifier may be based on information disposed on the chip, such as a cryptographic hash of another identifier, or a combination of an identifier and a code, or other values which alone, or in combination, can serve to uniquely identify a chip. In other examples, the unique identifier may be a cryptographic hash based on a randomly generated value and not based on any information on the chip, the private key, or the public key. In some examples, an encoded unique identifier may be the same or different from the unique identifier 107 by which components of the physical chip may be matched. In examples where the optical code portion 123 is the same or corresponds to a unique identifier 107, the alphanumeric portion 129 may be omitted (e.g., as it may be redundant to the unique identifier portion 107B).

The top, exposed component 121 may also include a unique identifier portion 107B. A unique identifier of the top-component of the sticker 120 may be printed within the unique identifier portion 107B. The top, exposed component may also include a window portion 127A through which a portion of a bottom-component 130 of a multi-component sticker 120 may be visible while other information corresponding to one or more other portions of the bottom-component of the sticker 120 remain concealed. The unique identifier may correspond to a serial number within a namespace of an issuer (or manufacturer) of the physical chip 101 such that the chip issuer may ensure a match of components of multi-component stickers 120 having respective information on different components and a match to the substrates 105 of different chips 101 having respective information disposed on them. For example, a unique identifier 107A may be disposed, such as etched or printed, on a substrate 105 of chip 101, printed 107B on the top-component 121, and printed 107C on the bottom component 130 within at portion visible from a window portion 127A of the top-component. Accordingly, for a complete chip 101, a top-component 121 may include visible public access information and the bottom-component 130 may include concealed private access information, the combination of which when matched by the unique identifier ensuring that the public access information corresponds to the private access information such that digital bearer assets transferred based on the public access information are held by an account to which access is permissioned based on the private access information of a bottom-component 130 (divulging of which is evident via removal of embodiments of a top-component 121 including one or more tamper-evident features). In some embodiments, as an additional layer of security, additional information may be disposed on the chip 101 in addition to the sticker components, such as on a surface of the substrate 105. For example, the substrate may have etched or printed thereon an encryption key or passphrase operable to obtain plaintext private access information from ciphertext private access information on the bottom-component 130 and which may be matched to the corresponding components based on the unique identifier (e.g., that is printed or etched on the substrate 105 of the chip 101). The matching of the unique identifiers 107 across the different components may be performed by visual inspection as private access information disposed on the bottom sticker component 130 and on the substrate 105 of the chip 101 is initially, and may remain, concealed until a user accesses the private information in order transfer assets from a digital wallet account.

In some embodiments, the window portion 127A of the top, exposed layer is aligned with a unique identifier portion 130 of the lower layer of the sticker 120, such that the unique identifier is visible within the window. In assembly of the sticker 120, the top, exposed layer substrate 121 may be aligned with the lower layer and the information printed on the top, exposed layer matched to the information printed on the lower layer based on the unique identifier printed within the unique identifier portion 130 of the lower layer. Thus, for example, the unique identifier printed on the lower layer may correspond to the unique identifier printed on the top, exposed layer of the sticker 120, the correspondence being visually verifiable by a user through a matching of the printed unique IDs by virtue of the window 127A. In turn, the sticker 120 may be applied to a substrate 105 of a chip 101, on which the unique identifier is disposed to indicate that the information on the chip 101 corresponds to the information printed on both layers of the sticker 120.

As described above, a QR code printed within the optical code portion 123 may be an encoded version of an alphanumeric string printed within the alphanumeric portion 129, for example, both may be an address corresponding to a public key or in some cases, the public key. In some embodiments, the public key of a public-private key pair may be utilized to generate an address. In some embodiments, the chip issuer may generate, with a server, a plurality of addresses for different decentralized computing platforms based off the public key, like a set of addresses corresponding to a set of decentralized computing platforms for which corresponding addresses are operable to receive digital bearer assets associated with the respective decentralized computing platform. In some examples, a QR code printed within the optical code portion 123 may be an encoded version of an identifier, like a wallet address identifier, which may be associated with one or more of the above-mentioned addresses in a database.

In some embodiments, one address or an identifier may be printed on a sticker 120, such as within the optical code portion 123 of a component 121 of the sticker, and a server (e.g., of the chip issuer) may be queried with information based on an optical reading of the QR code. In some examples, the query may return an address, or a set of addresses, based on the public key, or the public key may be retrieved (e.g., without accessing private access information concealed by the component 121). In some examples, the query may return information associated with an identifier based on a relation formed between the identifier and one or more addresses within a database. For example, the query may return information about the one or more addresses, like information about digital bearer assets held by one or more of the addresses, without a requirement to return an address or public key information.

In some embodiments, one or more addresses are printed on a component 121. In some embodiments, the public key is printed on a component 121. In some embodiments, the public key is printed on a component 121 in conjunction with an address. In some embodiments, the public key is disposed on the chip, such as under a mask, such that a user may retrieve the public key if necessary if component 121 is discarded. Further, in some embodiments, private access information like an encoded private key or the private key may be encapsulated (e.g., enveloped, covered, hidden, enclosed, or otherwise concealed) by component 121. For example, in various embodiments, the private access information may be included on a portion of a bottom-component 130 of a multi-component sticker 120 that is concealed by an upper, top-component 121 of the sticker which includes the public access information. In some embodiments, private access information (e.g., private access information included on a bottom-component 130 that is concealed by the top-component 121) may be disposed on a portion of the substrate 105 and concealed by one or more components of a sticker 120 (e.g., at least a component 121 having tamper-evident features). In some embodiments, the substrate 105 of the chip 101 is engraved or printed with private access information in duplicate (e.g., either by optical code or by alphanumeric text) to a bottom-component 130, which, in some embodiments, may provide means of obtaining private access information in instances where a bottom-component of a sticker is destroyed (e.g., by abrasion, moisture, fire, or other environmental exposure that the chip but not the sticker survives). The one or more features of components of a sticker to prevent scans or otherwise non-invasive methods of ascertaining private access information printed on a component of a sticker 120 (e.g., on the bottom-component 130) may also mitigate attempts to ascertain information that is printed, engraved or otherwise disposed on the substrate 105. In some embodiments, an engraving or etching or stamping or embossing may be filled or surrounded with a material of similar density, reflectivity, or both such that a scan or other non-invasive method cannot ascertain the information disposed on the substrate 105 (similar precautions may also be implemented for other information disposed on the substrate, like a passphrase or encryption/decryption key).

As described above, an address, e.g., within portion 123 or portion 129 of a chip 101, or otherwise associated with the chip (e.g., an address that is associated with an identifier of the chip) may be utilized within a decentralized computing platform for receiving transfer of a digital bearer asset of the decentralized computing platform, such as a transfer resulting from a user of the decentralized computing platform submitting a transaction on the corresponding platform. An example transaction, such as from a user by an address generated based on a public key for which that user also holds the corresponding private key may transfer the asset (or assets), like cryptographic currency, tokens, or NFTs, to a specified address (e.g., an address corresponding to the chip 101), or a set of specified addresses (e.g., like addresses corresponding to respective chips in a set of chips).

In some embodiments, an address is generated for a given decentralized computing platform based on the public key of a public-private key pair according to an address protocol (or format) specified by the given decentralized computing platform. For example, given a private (secret) key and corresponding public key of a key-pair, an address for a given platform (e.g., bitcoin blockchain in the example below) may be generated, such as by taking the corresponding public key (e.g., 33 bytes, 1 byte 0x02 (y-coordinate is even), and 32 bytes corresponding to x-coordinate) generated with the secret key, hashing on the public key (e.g., SHA256 cryptographic hashing function), hashing on the result of SHA-256 (e.g., truncating by RIPEMD-160 cryptographic hashing function), adding a version byte in front of RIPEMD-160 hash (e.g., 0x00 for Bitcoin on bitcoin blockchain, or other version byte as some blockchains may support different versions or variations of addresses for different digital bearer assets), hashing the result of the now extended truncated hash (e.g., SHA-256 hash), hashing the result (e.g., subsequent SHA-256 hash), taking the first X (e.g., 4) byte checksum of the result of the second hashing, and adding the 4 checksum bytes at the end of extended RIPEMD-160 hash from earlier to generate an address (e.g., a 25-byte binary Bitcoin address). In some embodiments, the 25-byte binary address may be converted into a byte string, such as a Base58 byte string, by Base58Check encoding, to generate an alphanumeric bitcoin address. Here, the resulting address may be verified deterministically based on the public key, a specific example for a version 1 BitCoin address is outlined in "Technical background of version 1 Bitcoin addresses," obtained on the filing date of this application and incorporated by reference herein from https://en.bitcoin.it/wiki/Technical_background_of_version_1_Bitcoin_addresses, a copy of which is included in the information disclosure statement filed with the application.

Other platforms may utilize similar steps but in a different sequence, different version bytes, or other variation such as in hashing order, hashing function used, truncation, and the like, but may be similarly deterministic based on the public key of the key pair for the given platform. For example, some decentralized computing platforms may have different address protocols having different checksums, different truncations (e.g., first values or last values), different prefixes, different one-way hashing functions, and the like. Some embodiments may include that generations of a set of addresses by a server or computing system of the issuer (or manufacturer that includes forming one or more addresses based on a public key by deterministically generating one or more of a first address among the set of addresses based on a Keccak-256 hash that is based on the public cryptographic key; a second address among the set of addresses based on a RIPEMD-160 hash of a SHA-256 hash that is based on the public cryptographic key, the second address also being based on a checksum based on the RIPEMD-160 hash, and the second address having a Base58 encoding based on a first dictionary; and a third address among the set of addresses with a Base58 encoding and a checksum that are both based on the public cryptographic key, the Base58 encoding of the third address being based on a second dictionary that is different from the first dictionary.

A server of the chip issuer may store a set of one or more of the addresses based on a given public key corresponding to an issued chip for respective platforms such that a user in possession of the issued chip may query the service to retrieve (or use) addresses for a plurality of platforms to transfer assets to respective addresses based on the public key (and later access those digital bearer assets, such as to original a transfer of held digital bearer assets, by accessing the private access information of the chip to obtain the corresponding private key). In some examples, a server may store a set of one or more of the addresses and return, in response to a query, information about digital bearer assets held by one or more of the addresses. One or more addresses or a public key may optionally be returned. In some examples, an address or a public key is not returned to prevent use of the chip in its original configuration for purposes other than those intended by the issuer. Thus, for example, a user of the chip may be required to access the private information stored on the chip to determine that information withheld from the user, where access of that information visually alters the chip from its original state.

In some embodiments, when a user wishes to access those digital assets, the user may access private access information concealed by a component 121 by lifting 125 and peeling off the component 121. Peeling off the component 121 reveals the information concealed thereunder, such as the private access information that corresponds to the public access information printed on the component 121 (e.g., within the optical code portion 123 or alphanumeric portion 129 or from another address in a set of addresses generated based on the public key). In some examples, private access information may correspond to an address stored by a server within a database that is associated with an identifier disposed within the optical code portion 123 (e.g., as an optical code).

Private access information may be printed on a bottom-component 130 and visible once a top-component 121 is removed. In some embodiments, a user may also peel, scratch, or otherwise interact with a mask 140 to reveal an encryption key by which ciphertext private access information may be decrypted to obtain plaintext private access information such as the private key. User experience is drastically simplified over previous implements, a component 121 of a sticker is physically peeled back (or off) to reveal a secret. And, by virtue of disclosed embodiments of a tamper-evident features of the component 121, loss of secrecy is physically apparent by visual inspection with the naked eye. Moreover, there is no need for a user to remember a set of key recovery passphrases, like those often used with electronic approaches.

FIG. 2 illustrates an example 200 of a substrate and multi-layer sticker apparatus including example tamper-evident features and verification features, according to some embodiments. Embodiments of the example 200 of a physical chip 101 may include a different window 127B configuration over that of the example in FIG. 1.

As shown in FIG. 2, the example window 127B is a cutout portion of component 121 that extends to the edge of the component 121 of sticker 120. In other words, in contrast to the example window 127A illustrated in FIG. 1, the example window 127B of FIG. 2 is not fully surrounded by the component 121. Thus, a bottom-component 130 may have an edge or perimeter portion that is not overlapped by the top-component 121, while the top-component 121 extends over another edge(s) or perimeter portion. Other example window configurations may also be used, or in some cases, a bottom-component 130 may extend beyond the border of a top-component 121, like a tab, which may correspond to a unique identifier portion 107C on which a unique identifier is printed and visible upon inspection of the card 101.

Figure 3A:
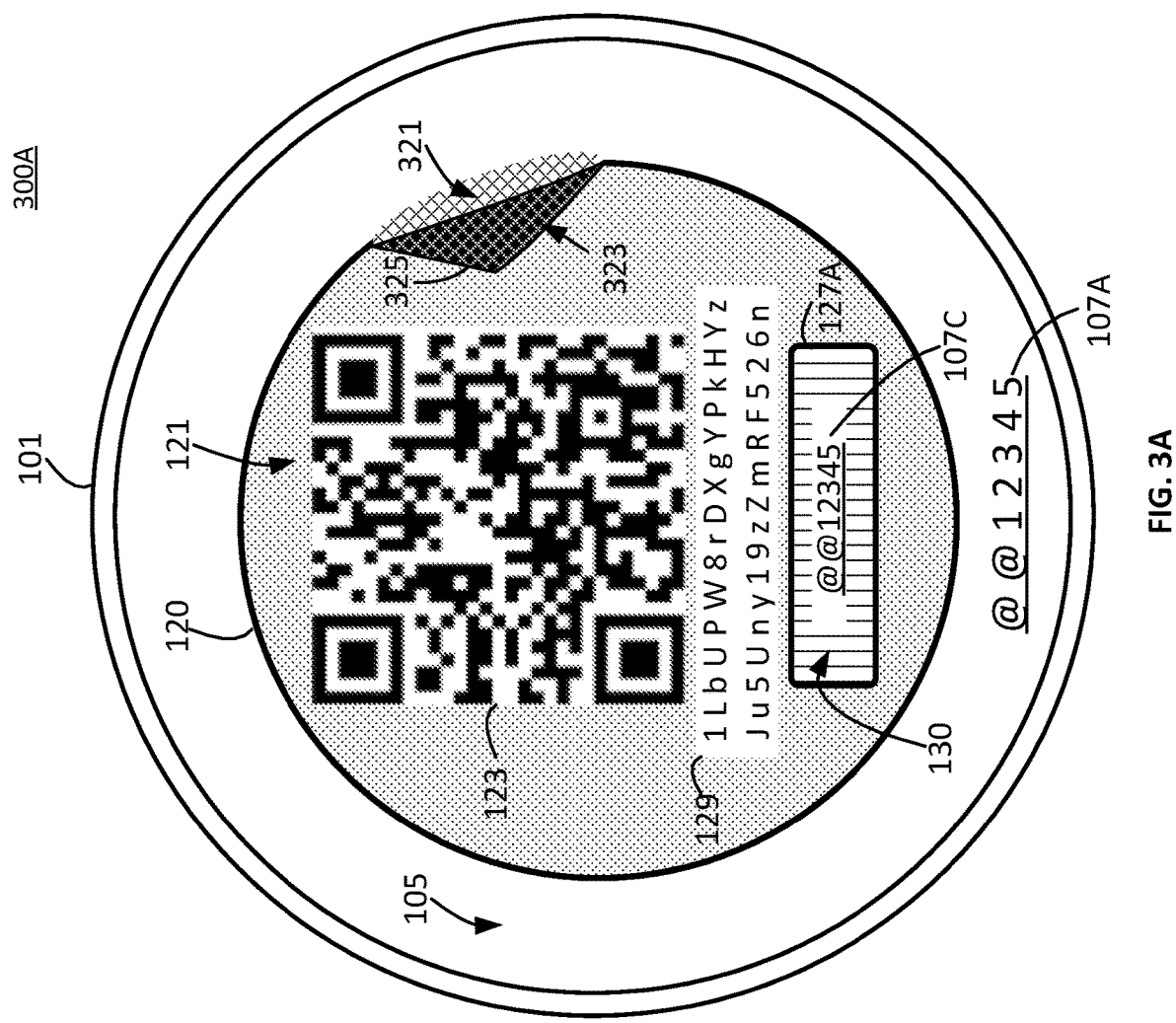
FIG. 3A illustrates an example of a substrate and multi-layer sticker apparatus including a tamper-evident top-component of a multi-component sticker, according to some embodiments.

FIG. 3A illustrates an example 300A of a substrate and multi-layer sticker apparatus including a tamper-evident top-component 121 of a multi-component sticker 120, according to some embodiments. Compared the examples of FIGS. 1 and 2, FIG. 3A illustrates a lifted 325 portion of a tamper-evident component 121.

As shown, a residue, like a tamper-evident pattern 321 of an adhesive layer or layer having an applied adhesive may remain adhered to a surface of a substrate 105 of the chip 101 when a corresponding portion of a tamper-evident component 121 adhered to the surface of the substrate is lifted 325 away. For example, the tamper-evident pattern 321 evident on the surface of the substrate may be a respective portion of the pattern formed in an adhesive layer or a lower layer of the component 121 that is configured to remain adhered to the surface of the substrate. Examples may include remaining adhesive, which may form a pattern, or remaining adhesive pattern layer, evident upon visual inspection.

In addition, a tamper-evident pattern 323 may be evident in the component 121, like a respective portion of the pattern formed in an adhesive layer or a lower layer of the component 121 that is configured to remain adhered to (e.g., is retained by) the component 121 when the component 121 lifted 325 from surface of the substrate 105. Thus, in some embodiments, the tamper-evident pattern 323 visible on the component 121 may appear as an inverse of the tamper-evident pattern 321 visible on the surface of the substrate 105. For example, if the pattern is a honeycomb-like pattern of hexagons, residue pattern 321 may be a plurality of hexagons and retained pattern 323 may be plurality of borders surrounding the hexagons, or vice versa. Alternatively, for a checkerboard-like pattern of squares, residue pattern 321 may be a plurality of offset squares (e.g., corresponding to red squares of a checkerboard if the black squares were removed) and retained pattern 323 may be a plurality of oppositely offset squares (e.g., corresponding to the black squares of a checkerboard that were removed). Other patterns or designs, whether randomly generated or having a specific structure, or tearing are equally applicable; the tamper-evidence aspect resulting from a first portion remaining as residue 321 on the surface of the substrate 105 and a second, opposing portion being retained 323 by the component 121 when lifted. In some embodiments, a residue portion 321 of the pattern may be distorted on the surface of the substrate 105 or a retained portion 323 of the pattern may be distorted on the lifted portion of the component 121 due to a lifting 325 away of the component 121. In some embodiments, a swatch disposed in the surface of the substrate 105 promotes the physical stripping away of the portion of the tamper-evident pattern 321 that remains on the surface of the substrate from the component 121.

As described above, the component 121 of the sticker 120 may encapsulate (e.g., envelope, cover, hide, enclose, or otherwise conceal) at least some private access information, whether that private access information is disposed on the surface of the substrate 105, on a bottom-component 130 of a multi-component sticker, or both. Accordingly, a tamper-evident feature of the component 121, like a bifurcation of an adhesive, adhesive layer, or a layer adhered to the surface of the substrate, such that some portion of the component 121 is physically stripped away (e.g., and remains on the surface of the substrate 105) while another portion is physically retained by the component 121 visibly displays evidence of tampering both on the surface of the substrate 105 and on the component 121. Moreover, because some portion of the component 121 is physically removed, a nefarious party cannot return the component 121 to its original appearance. As a result, a user can visually inspect a chip 101 to determine whether the private access information has been previously accessed.

Figure 3B:
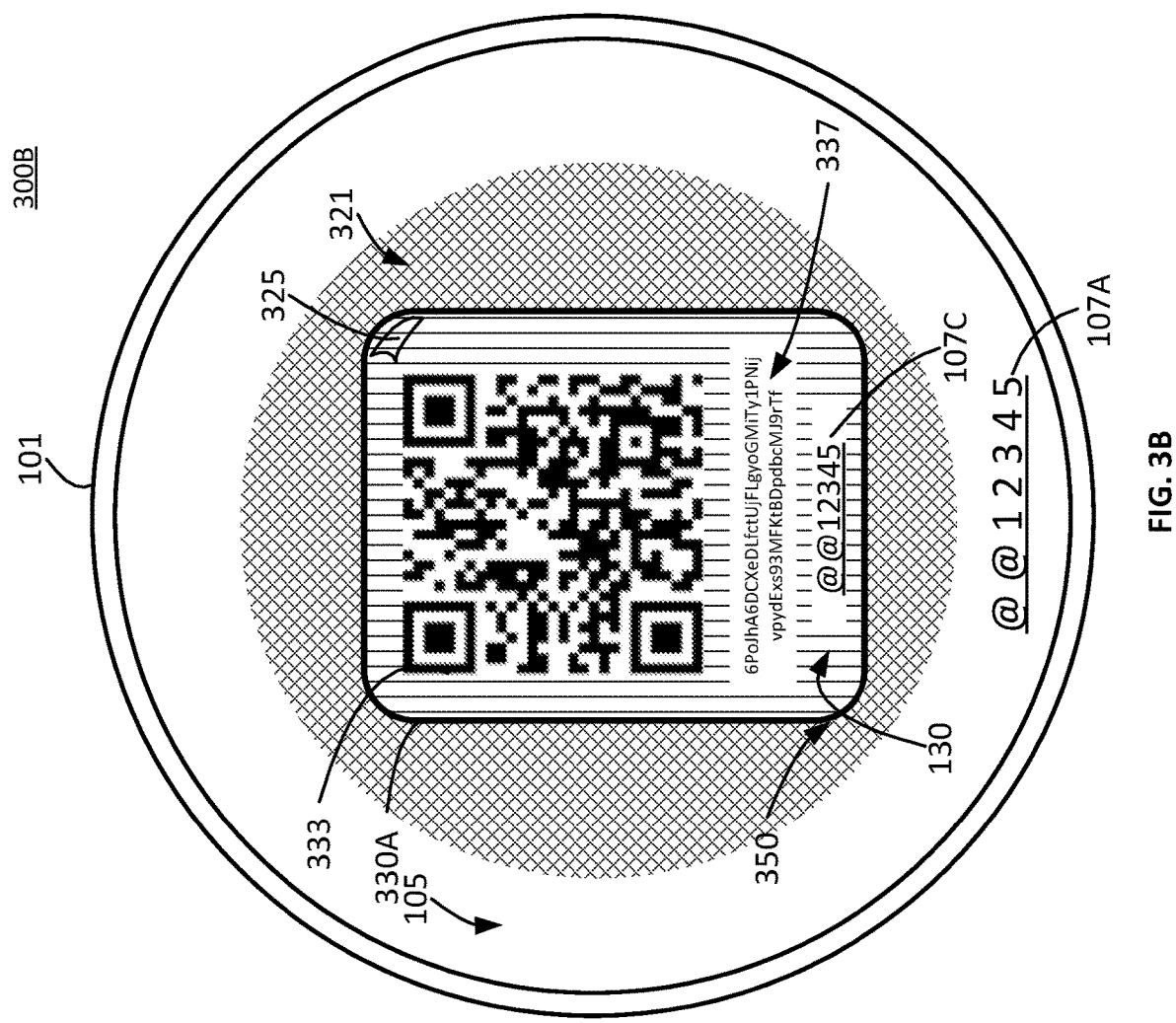
FIG. 3B and FIG. 3C illustrate examples of a substrate and multi-layer sticker apparatus showing a tamper-evident effect after removal of a tamper-evident top-component of a multi-component sticker to expose a bottom-component of the multi-component sticker, according to some embodiments.
Figure 3C:
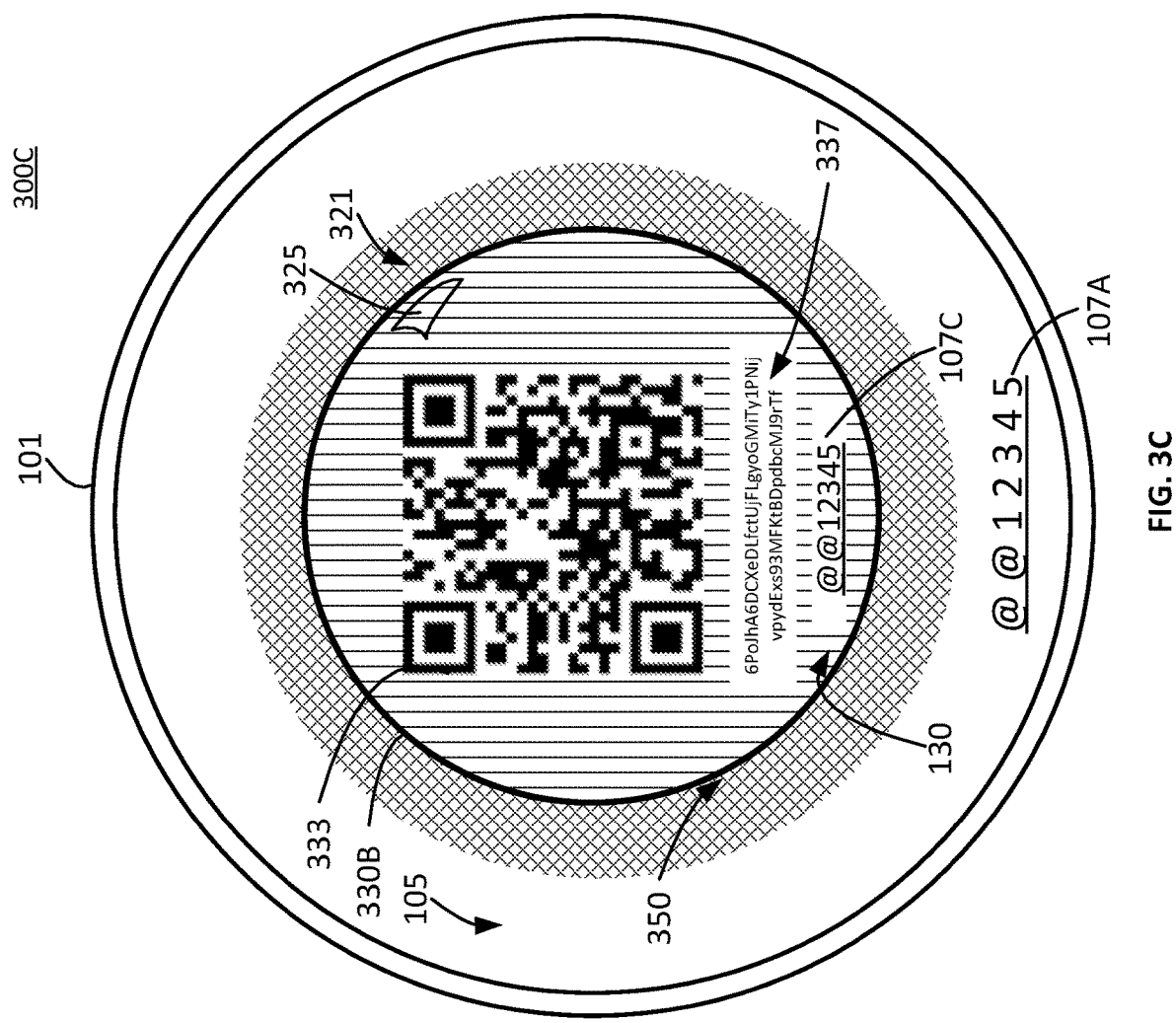

FIG. 3B and FIG. 3C illustrate examples 300B and 300C, respectively, of a substrate and multi-layer sticker apparatus showing a tamper-evident effect after removal of a tamper-evident top-component of a multi-component sticker to expose a bottom-component of the multi-component sticker, according to some embodiments. Compared the examples of FIGS. 1, 2, and 3A, FIG. 3B and FIG. 3C illustrate examples of a physical chip 101 subsequent to removal of a tamper-evident component (e.g., component 121 in FIG. 3A) concealing private access information. FIG. 3B and FIG. 3C show different example bottom-component 130 multi-layer sticker 330A, 330B, shapes, respectively, which in some examples, may be selected based on a window configuration of a top-sticker component, or desired form factor.

As shown, a residue, like a tamper-evident pattern 321 of an adhesive layer or layer having an applied adhesive may remain adhered to a surface of a substrate 105 when a tamper-evident component (e.g., component 121 in FIG. 3A) previously adhered to the surface of the substrate has been removed. For example, the tamper-evident pattern 321 evident on the surface of the chip may correspond to an area on the surface of the substrate 105 to which the tamper-evident component was adhered, the pattern corresponding to a portion of a pattern formed in an adhesive layer or a lower layer of the component and configured to remain adhered to the surface of the chip. Examples may include remaining adhesive, which may form a pattern, or remaining adhesive pattern layer, evident upon visual inspection.

As described above, the tamper-evident component (e.g., component 121 in FIG. 3A) may encapsulate (e.g., envelope, cover, hide, enclose, or otherwise conceal) at least some private access information, whether that private access information is disposed on the surface of the substrate 105, on a bottom-component 130 of a multi-component sticker, or both. Here, a bottom-component 130 of a multi-component sticker is shown. In some embodiments, some or all of the information printed on the bottom-component 130, or information by which some or all of the information printed on the bottom-component may be recovered, or information by which information printed on the bottom-component may be accessed in plaintext, may be disposed on the surface of the substrate 105, such as within an area corresponding to the illustrated bottom-component 130. Some embodiments may include the information in addition to, or instead of, the bottom-component 130 (e.g., such that if the bottom-component 130 is destroyed or unreadable, private access information disposed in the surface of the substrate 105 may be utilized to access digital bearer assets that were transferred to an address associated with the chip 101).

As shown, a bottom-component 130 of a multi-component sticker is revealed when a top-component of the multi-component sticker is removed from the chip 101. The bottom-component 130, like the top-component, may be a sticker 330. In some embodiments, the bottom-component 130 is formed as a sticker 330 and applied to the surface of the substrate 105 (e.g., within the center of a swatch or within a designated area having a swatch) prior to positioning of a top-component. The top-component (e.g., component 121 in FIG. 3A) having tamper-evident features may also be formed as a sticker (e.g., sticker 120 in FIG. 3A), positioned over the sticker 330, and applied such that it conceals at least some information on sticker 330 and also adheres to at least some portions of the surface of the substrate 105 (e.g., an area surrounding, or at least partially surrounding the sticker 330). In turn, when the tamper-evident top-component is removed, a tamper-evident pattern 321 within areas surrounding the component is revealed when the top-component is removed. Thus, for example, the bottom-component 130 may be a sticker 330 and the top-component may also be a sticker, which are formed separately and applied in sequence to create a multi-component sticker. In some embodiments, the bottom-component 130 may be a sticker 330, and the top-component may also be a sticker, which are formed separately and merged to form a single multi-component sticker prior to application thereof to the surface of the chip. In some embodiments, the bottom-component 130 may be formed, and the top-component is formed over the bottom-component to form a single-multi-component sticker prior to application thereof to the surface of the chip. Regardless of the specific process, a bottom-component 130 may comprise private access information concealed by the top-component.

In some embodiments, the bottom-component 130 has at least a portion of other information visible while the top-component is positioned to conceal the private access information. In some embodiments, the bottom-component 130 has an upper-layer of material or a coating to which the adhesive of the top-component adheres less strongly to than a surrounding portion of the chip (e.g., the surface of the substrate of the chip, which may include a swatch). In some embodiments, the top-component comprises a different adhesive corresponding to a surrounding portion than a center concealed portion. In some embodiments, the bottom-component 130 has an applied a coating, like a UV protective coating, or a sealant, which may be a layer of film or other coating, such that the top-component adheres less strongly to its surface than the surrounding area within which the tamper-evident pattern 321 is promoted and that strength of the adhesion is less than a threshold strength of adhesion sufficient to promote tamper-evidence such that removal of the top-component does not substantially obfuscate the private access information below upon removal. In some embodiments, the bottom-component 130 causes tamper-evidence to appear in a corresponding lifted portion of the top-component but without substantial residue remnants (or affords ease of removal thereof) on the bottom-component. For example, removal of the top-component may cause residue (or a portion of the adhesive layer) to remain on the portion of the chip surrounding the bottom-component 130 but not on the bottom-component itself, but which may be adhere within a threshold strength sufficient to cause distortion of a pattern in the lifted top-component.

In some embodiments, the top-component comprises two different adhesives, a center adhesive corresponding to an area of the bottom-component 130 being different than a surrounding adhesive corresponding to the surrounding portion of the chip. In some embodiments, the tamper-evident pattern is not promoted (e.g., applied) within the center area of the adhesive layer or layer adjacent to the adhesive but within the surrounding area corresponding to the surrounding portion of the chip. In some embodiments, the top-component comprises a first layer of film adjacent to the adhesive corresponding to the center area but not the surrounding area and a subsequent layer overlapping the first layer and having dimensions corresponding to the surround area, the second layer having tamper evident features such that the tamper-evident pattern 321 is promoted in the surrounding area but a first layer corresponding to the area of the bottom-component 130 may be removed (either with the top-component or subsequent thereto) without leaving residue. In some embodiments, that first layer has a scratch-off coating, by which the private access information may be revealed, or in some embodiments, that first layer may be a top-layer of the bottom-component.

In some embodiments, removal of the top-component leaves a gap 350 between the bottom-component 130 and the surrounding tamper-evident portion 321. In some embodiments, the tamper-evident portion 321 corresponds to a swatch etched on the chip, which may have a corresponding gap 350 between an outer swatch promoting adhesion of the top-component and an inner swatch promoting adhesion of the bottom-component 130.

As shown, private access information disposed on the bottom-component 130 (or information disposed in corresponding areas of the surface of the substrate of the chip) was substantially concealed (e.g., other than a window or cutout corresponding to the unique identifier portion 107C of the bottom-component) by the top-component and is revealed upon removal of the top-component. In some embodiments, the information that was concealed by the top-component comprises private access information. For example, as shown, the concealed portion of the bottom-component 130 may include another optical code portion 333 and an alphanumeric portion 337, which may correspond to a private key by which accounts based on a corresponding public key in the public-private key pair may be accessed. For example, an optical code, like a QR code, disposed within the optical code portion 333 may encode the private key which may be reproduced in alphanumeric text within the alphanumeric text portion 337. Alternatively, and to increase security (such as by forcing a nefarious party to access addition information concealed by a tamper-evident component, and for other security purposes, such as during creation of the apparatus, as discussed in more detail herein), the optical code and alphanumeric text, rather than corresponding to the private key directly, may correspond to a cipher text of the private key, the plaintext of which is the private key of the key pair by which the associated accounts may be accessed. To generate the ciphertext, the plaintext of the private key (or other private information) may be encrypted with a symmetric encryption protocol utilizing information (e.g., an encryption key, like a passphrase) concealed by at least portion of a tamper-evident component. In some embodiments, the encryption key is operable to decrypt the ciphertext by a corresponding symmetric decryption protocol to reveal the plaintext of the private key of the key-pair. Thus, in some example embodiments, a user must remove the tamper-evident top-component to reveal the ciphertext and remove or scratch off a tamper-evident component to reveal the encryption key in order to ascertain the plaintext of the private key. In some examples, as described above, aspects of private access information, like a passphrase, may be concealed by a tamper-evident component, like a sticker, which may include one or more of the top-component 120 sticker and the bottom-component 130 sticker, or other masking component.

Figure 4A:
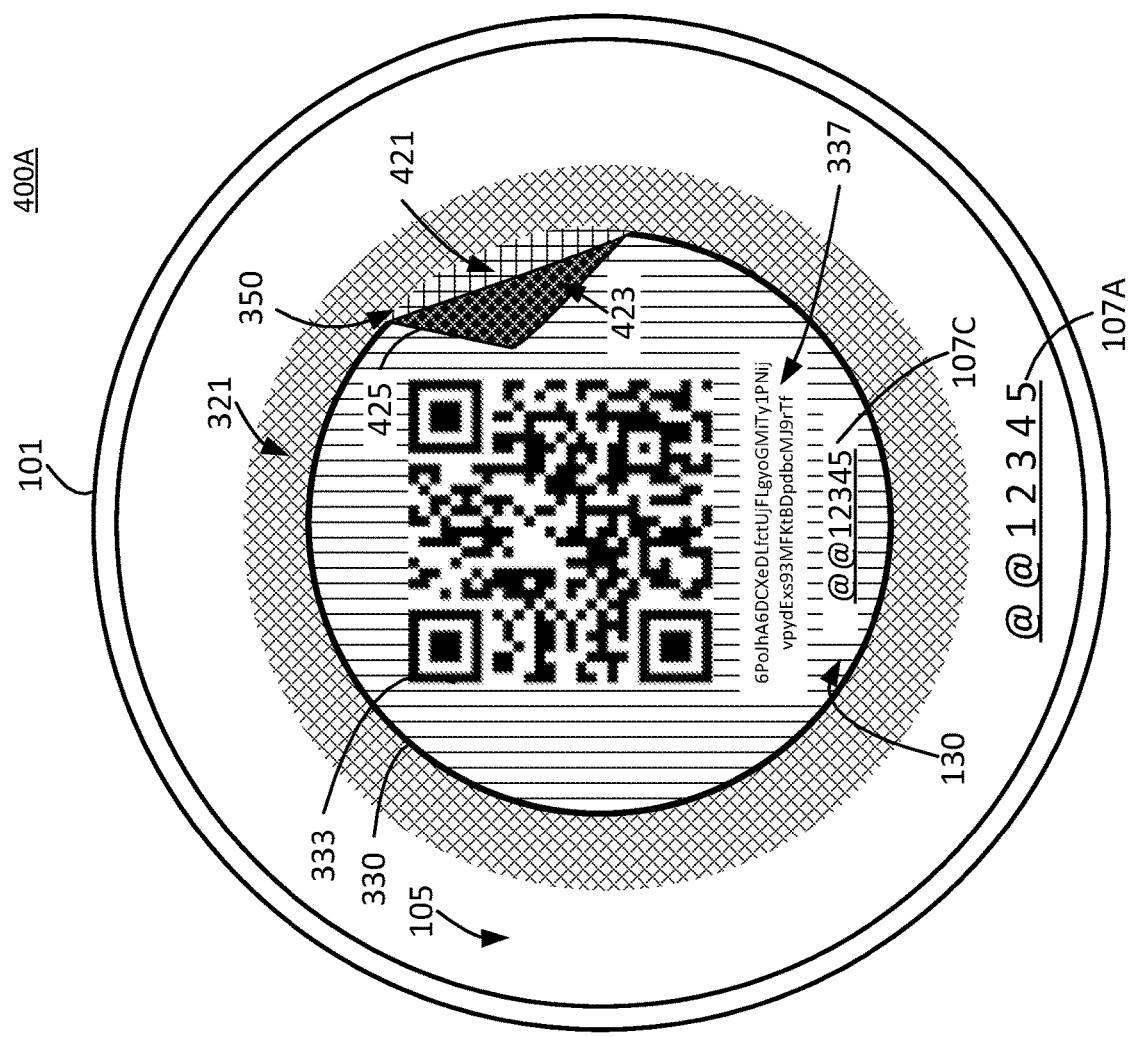
FIG. 4A, FIG. 4B, and FIG. 4C illustrate examples of a substrate and multi-layer sticker apparatus including a concealed encryption key or passphrase on the substrate, and exposing of the concealed portion of the substrate, according to some embodiments.
Figure 4B:
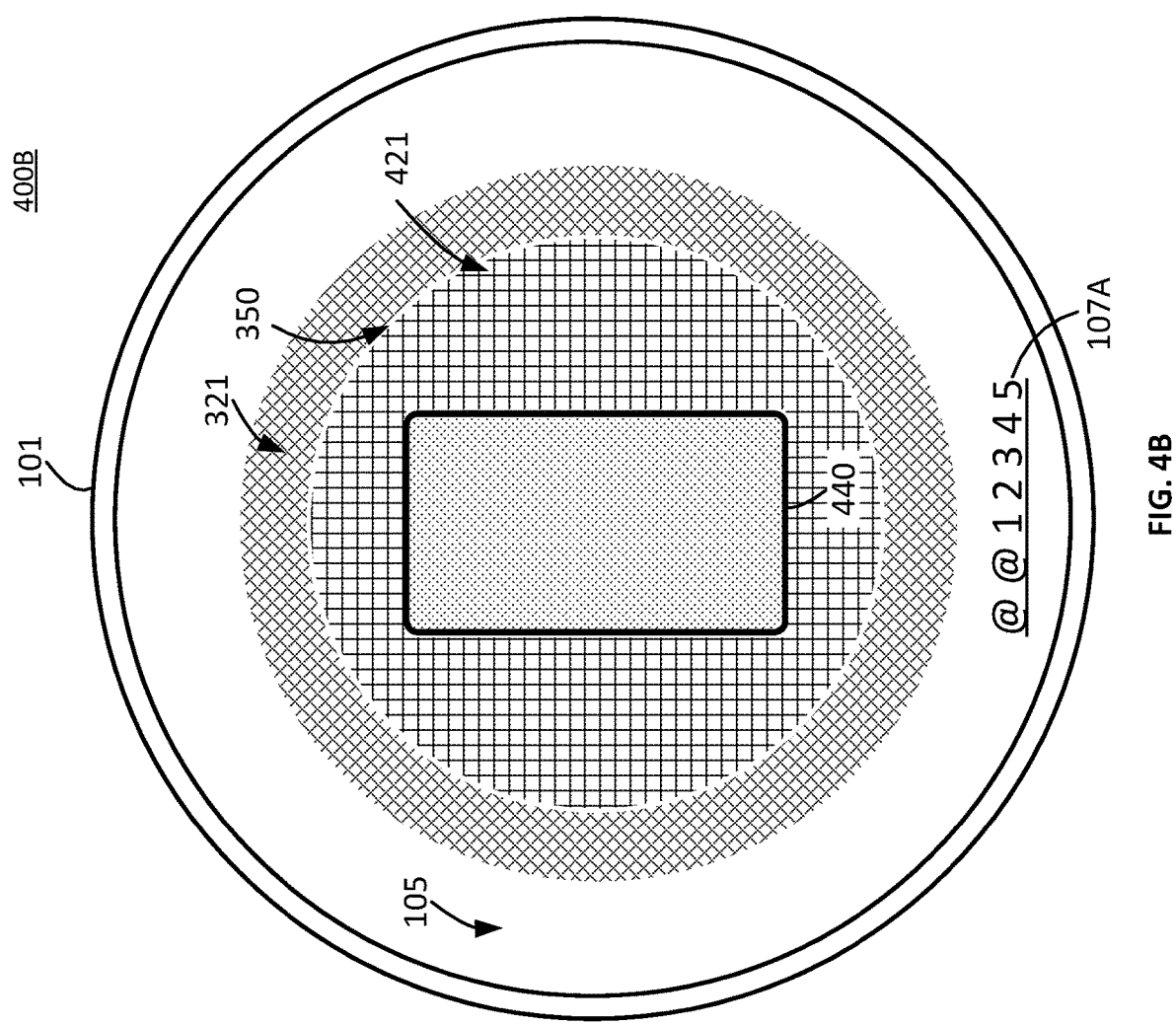
Figure 4C:
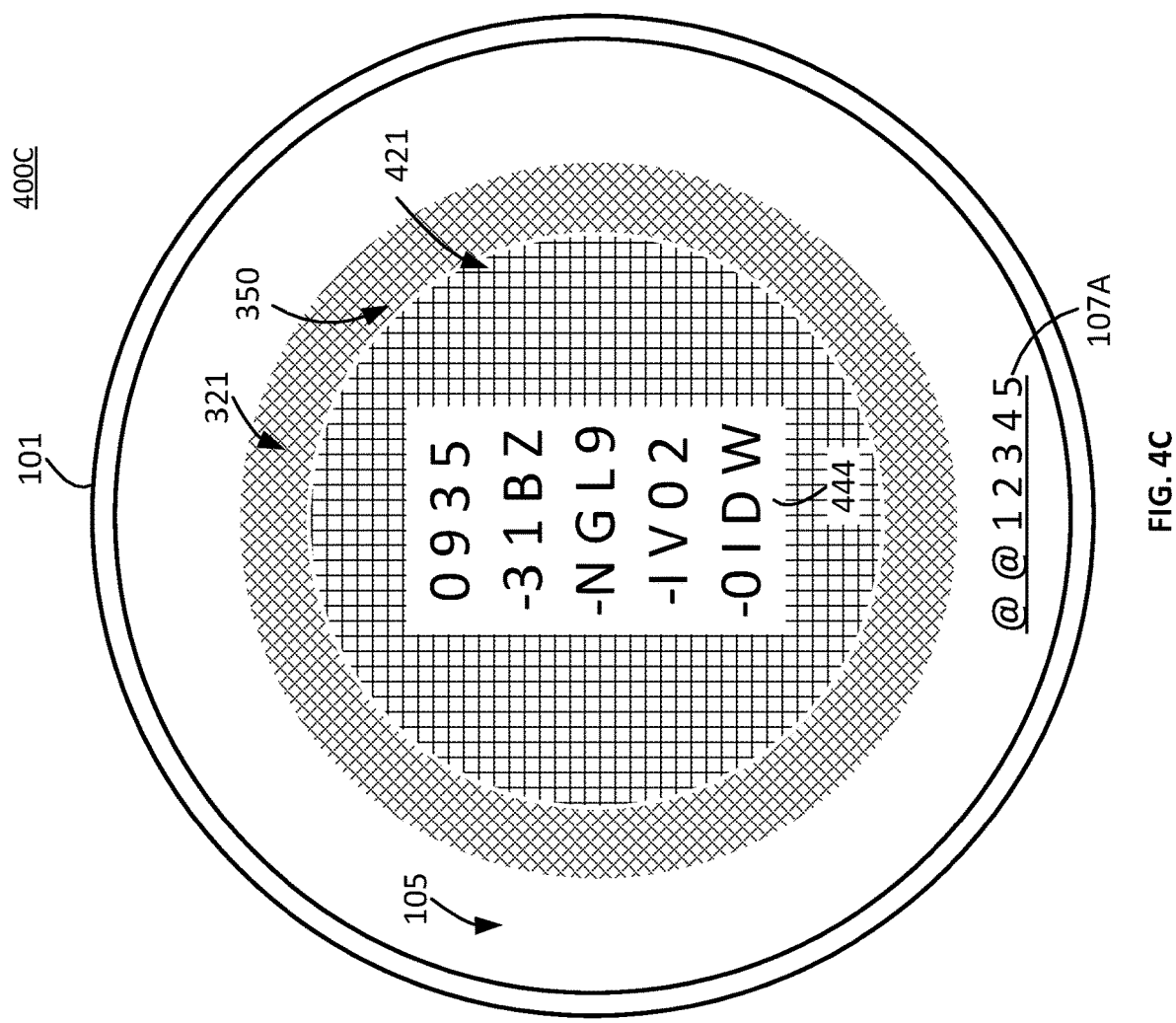

FIG. 4A, FIG. 4B, and FIG. 4C illustrate examples of a substrate and multi-layer sticker apparatus including a concealed encryption key or passphrase on the substrate, and exposing of the concealed portion of the substrate, according to some embodiments. FIG. 4A and FIG. 4B show examples 400A, 400B, respectively, of a tamper-evident effect after removal of a tamper-evident component, such as of a multi-component sticker, to expose a substrate of the chip, according to some embodiments.

FIG. 4A illustrates a lifted 425 portion of a component 130, which may be optionally tamper evident in some example embodiments. As shown, a residue, like a tamper-evident pattern 421 of an adhesive layer or layer having an applied adhesive may remain adhered to a surface of the substrate 105 when a corresponding portion of a tamper-evident component 130 adhered to the surface of the substrate is lifted 425 away. For example, the tamper-evident pattern 421 evident on the surface of the substrate may be a respective portion of the pattern formed in an adhesive layer or a lower layer of the component 130 that is configured to remain adhered to the surface of the substrate of the chip. Examples may include remaining adhesive, which may form a pattern, or remaining adhesive pattern layer, evident upon visual inspection.

In addition, a tamper-evident pattern 423 may be evident in the component 130, like a respective portion of the pattern formed in an adhesive layer or a lower layer of the component 130 that is configured to remain adhered to (e.g., is retained by) the component 130 when the component 130 lifted 425 from surface of the substrate 105 to which it adheres. Thus, in some embodiments, the tamper-evident pattern 423 visible on the component 130 may appear as an inverse of the tamper-evident pattern 421 visible on the surface of the substrate 105. For example, if the pattern is a honeycomb-like pattern of hexagons, residue pattern 421 may be a plurality of hexagons and retained pattern 423 may be plurality of borders surrounding the hexagons, or vice versa. Alternatively, for a checkerboard-like pattern of squares, residue pattern 421 may be a plurality of offset squares (e.g., corresponding to red squares of a checkerboard if the black squares were removed) and retained pattern 423 may be a plurality of opposingly offset squares (e.g., corresponding to the black squares of a checkerboard that were removed). Other patterns or designs, whether randomly generated or having a specific structure, or tearing are equally applicable; the tamper-evidence aspect resulting from a first portion remaining as residue 421 on the surface of the substrate 105 and a second, opposing portion being retained 423 by the component 130 when lifted. In some embodiments, a residue portion 421 of the pattern may be distorted on the surface of the substrate 105 or a retained portion 423 of the pattern may be distorted on the lifted portion of the component 130 due to a lifting 425 away of the component 130. In some embodiments, a swatch disposed in the surface of the substrate 105 promotes the physical stripping away of the portion of the tamper-evident pattern 421 that remains on the surface of the substrate from the component 130.

As described above, one or more components of a multi-component sticker may encapsulate (e.g., envelope, cover, hide, enclose, or otherwise conceal) at least some private access information, whether that private access information is disposed on the surface of the substrate 105, on a bottom-component 130 of a multi-component sticker, or both. Accordingly, one or more tamper-evident features of one or more components, like one or more stickers, may include features like a bifurcation of an adhesive, adhesive layer, or a layer adhered to the surface of the substrate, such that some portion of a component is physically stripped away (e.g., and remains on the surface of the substrate 105) while another portion is physically retained by a respective component to visibly display evidence of tampering both on the surface of the substrate 105 and on sticker components.

FIG. 4B shows an example 400B of a completed lifting of component 130 from a substrate of a chip, in accordance with some example embodiments. As shown, one or more patterns 321, 421 corresponding to tamper-evident features of components of a multi-component sticker may be visually evident on a surface of the substrate of the chip 101. For example, pattern 321 may correspond to a top-component and 421 may correspond to a bottom-component, thus permitting visual indication of which information has been accessed. In some examples, information, like private access information, which may include an encryption/decryption key or passphrase, or other information, that is disposed on the substrate 105 of the chip may be further concealed, such as by an optional mask 440, in addition to the one or more other sticker components.

FIG. 4C illustrates an example 400C of a chip including an area of substrate including an encryption/decryption key or passphrase that is exposed after removal of one or more components or masks, according to some embodiments. Compared to the examples of FIG. 4A and FIG. 4B, FIG. 4C illustrates a physical chip 101 subsequent to removal of one or more tamper-evident components concealing private access information, such as by peeling away or scratching off a surface. Examples of such components, like one or more stickers, may mask a passphrase 444 or other information disposed on a surface of the substrate 105 of the chip. As shown, one or more sticker components (e.g., top-component 120 or top-component 130), may mask the passphrase, and one or more of the stickers components may include tamper-evident features. In some examples, an additional tamper-evident component may further mask the passphrase (e.g., component 440 in FIG. 4B) concealing an encryption key (like a passphrase) by which private access information in plaintext can be obtained from the ciphertext disposed on a bottom-component sticker (now removed). In some examples, only a portion of the bottom-component sticker may be removed to reveal a portion of the surface of the substrate 105 on which the passphrase or other information is disposed.

In some examples, the passphrase 444 may be disposed within a first region of the surface of the substrate 105, masked, and then encrypted private access information protected by the passphrase may be disposed in duplicate to on the bottom-component sticker within a second region, and all or some of each region may be covered by mask 440 or one or more other components, like one or more of the top or bottom components of a multi-component sticker, or one or more layers of a multi-layer sticker.

With reference to FIGS. 4A, 4B, and 4C, as shown, the information that was concealed by a tamper-evident component, like a sticker, and in some examples, an additional mask 440, may be an encryption key 444 of a symmetric encryption protocol that was utilized to encrypt the private access information (e.g., a private key) of a key pair to produce the ciphertext printed within the alphanumeric ciphertext portion 337 of the bottom-component 130. A user may scan an optical code or input the alphanumeric ciphertext portion of the bottom-component, and then access the passphrase 444 by removing some or all of one or more of a bottom-component or mask (e.g., to reveal the passphrase 444 disposed on the surface of the substrate 105 of the chip 101). An optical code, like a QR code, may be an encoding of the ciphertext which is printed within the optical code portion 333 of the bottom-component (as shown in FIG. 4A). Example symmetric encryption protocols include, but are not limited to, AES-128, AES-192, AES-256, and the like. In some embodiments, a protocol corresponding to a decentralized computing platform is utilized. For example, a Bitcoin Improvement Protocol (e.g., BIP38) or other protocol may specify one or more protocols by which a private key may be protected with an encryption key or passphrase. In some embodiments, an encryption function of a protocol takes, as input, a plaintext private key (e.g., in a given format) and an encryption key or passphrase (e.g., in a given format) by which the ciphertext of the private key is generated (or protected by under the protocol) and corresponds (e.g., uniquely) to the ciphertext in the given protocol. In some embodiments, a portion of the encryption key or passphrase may be a checksum, like a verification code, by which a user may verify the ciphertext. A decryption function of the protocol may take, as input, a ciphertext private key (e.g., in a given format) and the corresponding encryption key or passphrase, which may be input by a scanning of the optical code and keying in or optical character recognition or separate optical code of the encryption key or passphrase. In turn, the decryption function of the protocol outputs the plaintext private key backing the accounts corresponding to the chip 101.

FIG. 5A, FIG. 5B, FIG. 5C, FIG. 5D, FIG. 5E, and FIG. 5F illustrate examples of multi-layer sticker construction and application to a substrate, according to at least some embodiments.

Figures 5A, 5B:
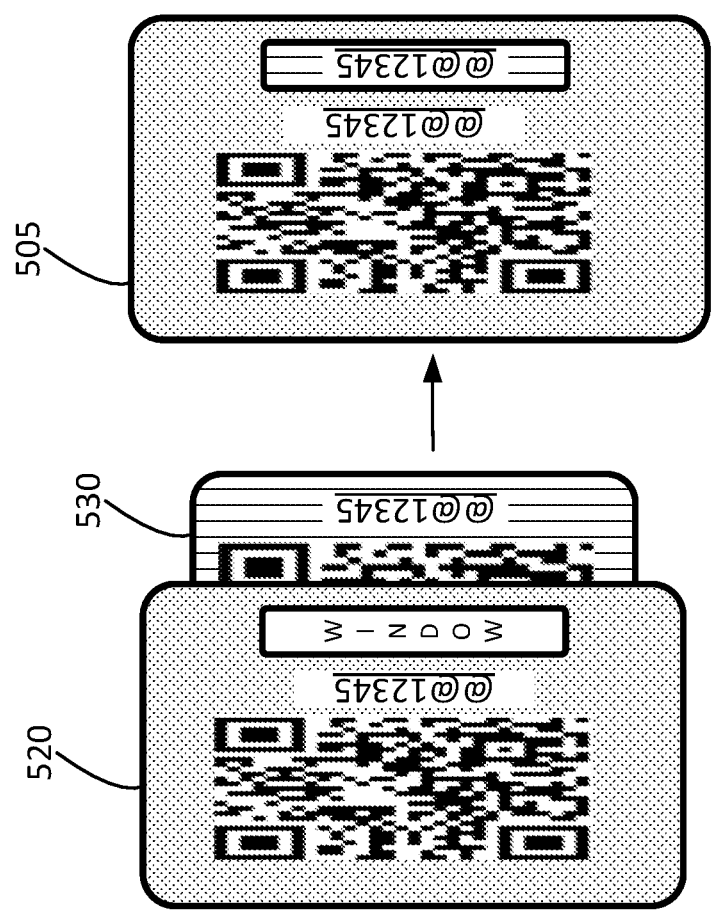
FIG. 5A, FIG. 5B, FIG. 5C, FIG. 5D, FIG. 5E, and FIG. 5F illustrate examples of multi-layer sticker construction and application to a substrate, according to at least some embodiments.

FIG. 5A illustrates an alignment of a top-component 520 and a bottom-component 530 of a multi-component sticker, according to at least some embodiments. Each component of a multi-component sticker may include one or more layers, and thus a multi-component sticker may comprise two or more layers, and in some examples, four or more layers. In some examples, a bottom-component 530 includes a first information portion that is encapsulated (e.g., enveloped, covered, hidden, enclosed, or otherwise concealed) by the top-component 520. The bottom-component 530 includes a second information portion visible through a window of the top-component 520. Thus, for example, the bottom-component 530 and top-component 520 may be aligned to produce a multi-component sticker. In some embodiments, the bottom-component 530, as a result of the alignment, includes a portion concealed by the top-component 520 (e.g., the portion including private access information) and another portion that is visible when the top-component 520 is aligned (e.g., the portion including a unique identifier or other non-concealed information disposed on the bottom-component). For example, the top-component 520 may be placed (or formed) in position over (e.g., above) the bottom-component 530 on a roll of stickers, or they may be applied separately in sequence to a chip (e.g., the bottom-component 530 followed by the top-component 520).

Embodiments of top-components 520 and bottom-components 530 may have the same or different shapes without departing from the techniques discussed herein. Examples of components may be round, square, rectangle, or other geometric shapes of differing sizes that are consistent with providing functions like those discussed herein.

FIG. 5B illustrates a multi-component sticker 505, according to at least some embodiments. As shown, the window portion of the top-component of the multi-layer sticker 505 exposes the second information portion of the bottom-component. The second information may be a unique identifier printed on both the top-component and the bottom-component of the multi-layer sticker for inspection. For example, a user may inspect the unique identifiers to verify a match between the top-component and the bottom-component.

Figure 5D:
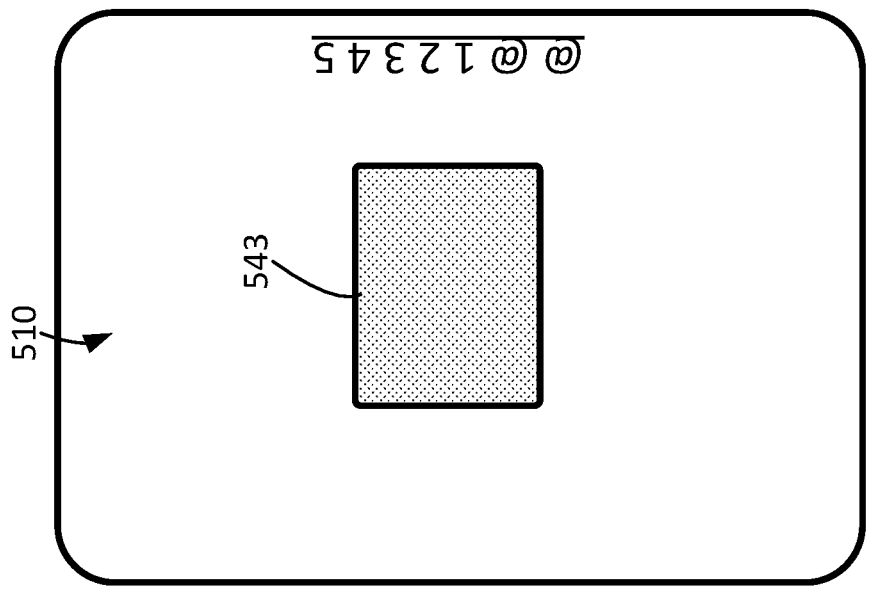
Figure 5C:
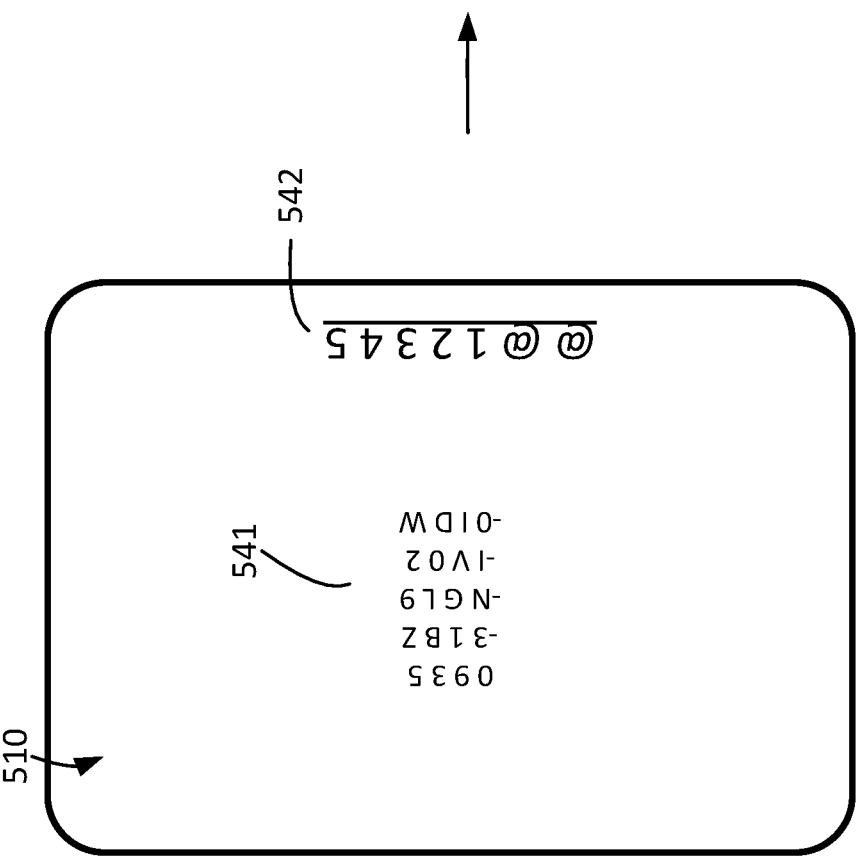

FIG. 5C illustrates an example substrate 510 on which various informational components may be disposed. For example, a unique identifier 542 may be disposed on the substrate 510 within one region and information 541 that is to be concealed by one or more components within another region. Examples of information 541 may include encryption/decryption information or passphrase or private access information.

FIG. 5D illustrates an examples substrate 510 after the optional disposing of an additional masking 543 component over all or some of information 541. For example, a passphrase may be concealed by mask 543. In some examples, then, another information portion may be optionally disposed on the surface of the substrate, like encrypted private access information, such as in duplicate to encrypted private access information disposed on a bottom-component of a multi-component sticker.

Figures 5E, 5F, 5G:
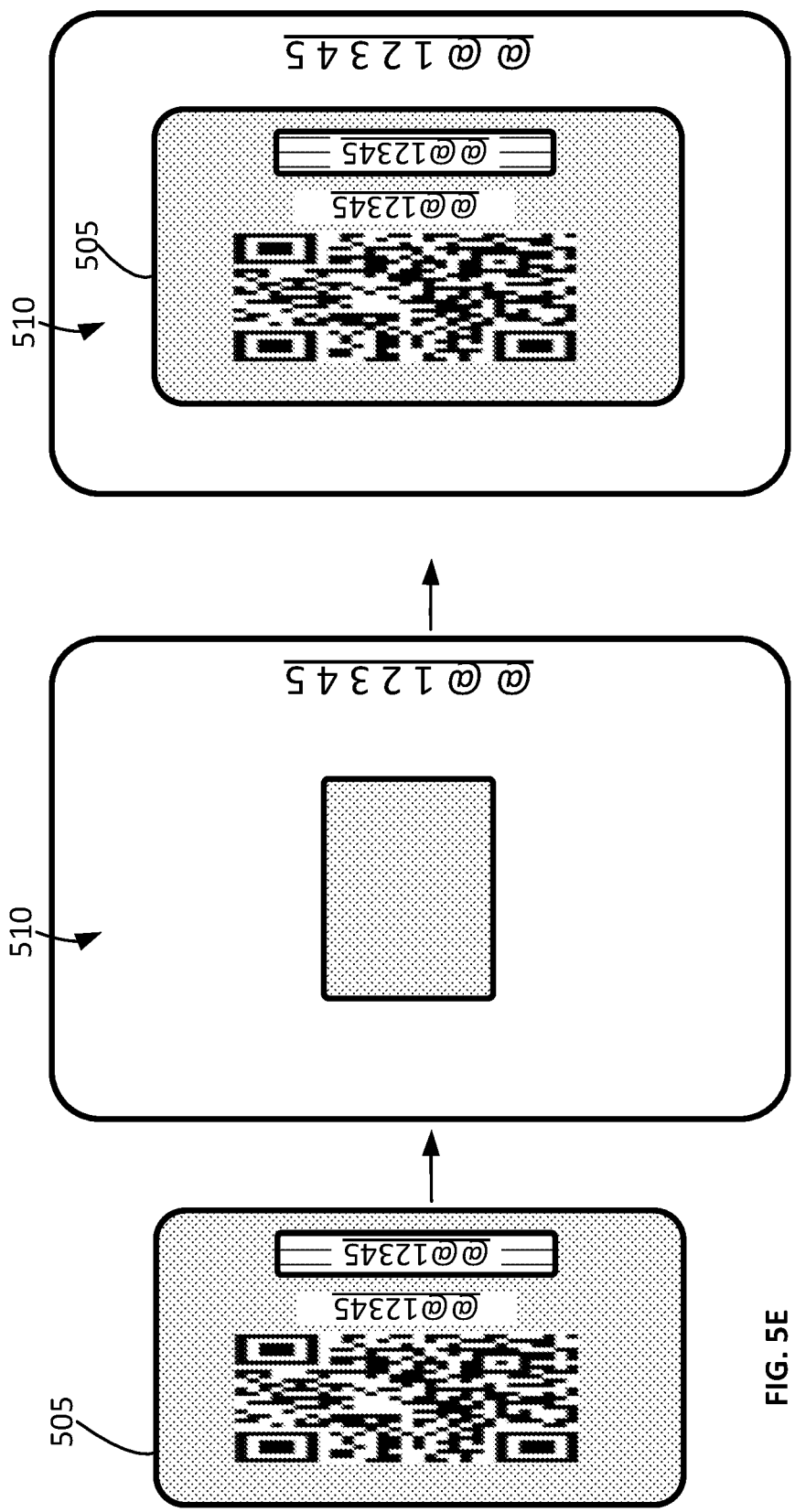

FIG. 5E illustrates an example multi-component sticker 505 which may be matched to a corresponding substrate 510 illustrated in FIG. 5F based on a correspondence of unique identifiers across the sticker components and the substrate.

FIG. 5G illustrates an example apparatus for physically maintaining digital wallet credentials that includes a pairing of substrate 510 with multi-component sticker 505. For example, multi-component sticker 505 may be applied to substrate 510, examples of which may be of different shapes, like a card or ship, according to at least some embodiments. In some embodiments, a portion of the substrate 510 to which the sticker 505 is applied comprises a swatch to promote adhesion. In some embodiments, the substrate 510 includes a unique identifier disposed thereupon having correspondence to the unique identifier of the sticker 505 components. For example, the unique identifier may be visible on a bottom-component of the sticker via a window of the top-component, and the top-component may also include the unique identifier. Accordingly, a matching of the components of the sticker 505 and the substrate 510 to ensure that the information printed on the different components of the sticker 505 and information disposed on the substrate 510 (e.g., under a mask 543) are collectively operative.

Figure 6A:
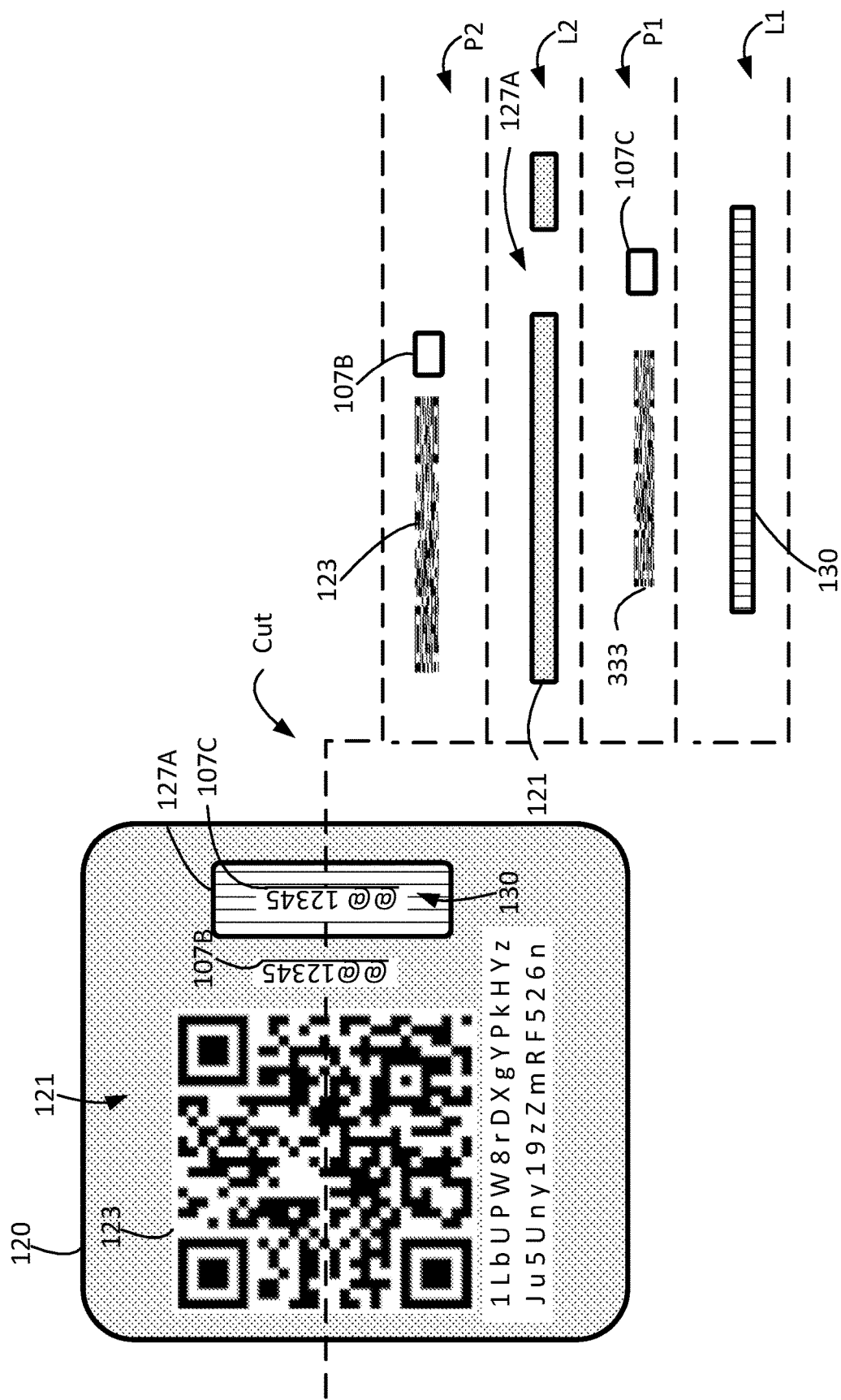
FIG. 6A and FIG. 6B illustrate examples of a multi-component sticker, according to some embodiments.
Figure 6B:
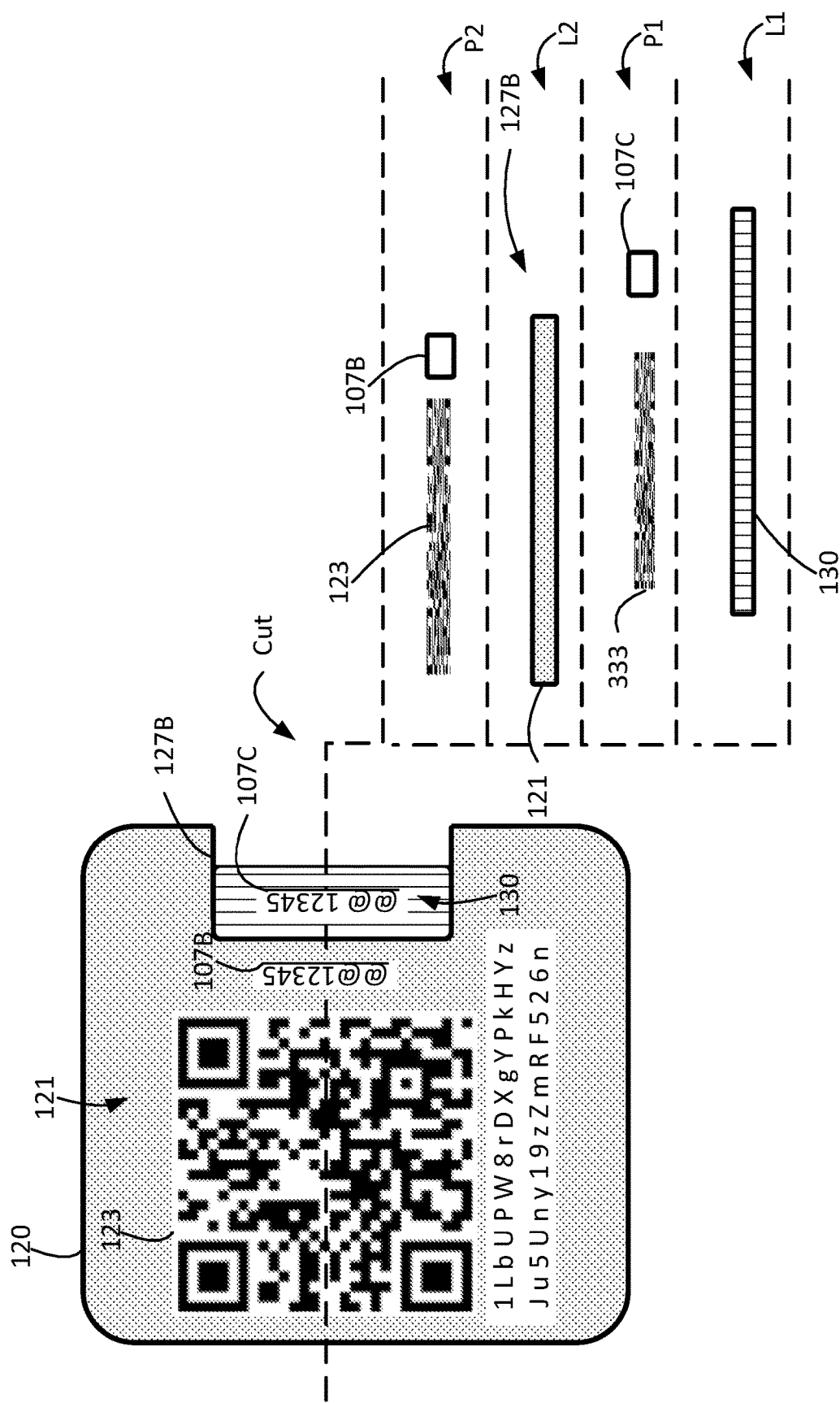

FIG. 6A and FIG. 6B illustrate examples of a multi-component sticker 120, according to some embodiments. In each of FIG. 6A and FIG. 6B, a cut is shown through the multi-component sticker 120 to illustrate the example configurations of the different components.

FIG. 6A illustrates example multi-component sticker 120 having a top-component 121 and a bottom-component 130. As shown, along the cut, the top-component 121 includes an optical code portion 123, a unique identifier portion 107B, and a window 127A. Within the window 127A, a portion of the bottom-component 130 is visible. The visible portion may correspond to a unique identifier portion 107C of the bottom-component 130 such that the multi-component sticker 120 may be visually inspected to ascertain whether the different components 121, 130 having different information printed thereon in optical code portions correspond to each other.

As shown, a bottom-component 130 may correspond to a first layer, L1, of the multi-component sticker 120. Upon the bottom-component 130, information may be printed thereon, such as first printed information, P1. The first printed information may include, along the cut, an optical code portion 333 and a unique identifier portion 107C. Private access information, like a private key of a public-private key-pair, or ciphertext hereof may be encoded as an optical code that is printed within the optical code portion 333 of the bottom-component. Similarly, a unique identifier may be printed within the unique identifier portion 107C, and the unique identifier portion 107C may correspond to an area of the bottom-component that is aligned with a window 127A of a top-component 121.

As shown, a top-component 121 may correspond to a second layer, L2, of the multi-component sticker 120. Upon the top-component 121, information may be printed thereon, such as second printed information, P2. The second printed information may include, along the cut, an optical code portion 123 and a unique identifier portion 107B. Public access information, like a public key (that corresponds to the above noted private key), an address based on the public key and in a format of a decentralized computing platform, or a unique address identifier for identification of an address or public key within a database, may be encoded as an optical code that is printed within the optical code portion 123 of the top-component. Similarly, a unique identifier may be printed within the unique identifier portion 107B. Within the top-component 121, a window 127A may be formed, such as by a removal of that area from the top-component (e.g., punching or cutting out the portion). As shown, the window 127A is aligned with an area (e.g., a unique identifier portion 107C) of the bottom-component 130 within which a unique identifier is printed, such that the unique identifier is visible through the window 127A in the multi-component sticker 120. Notably, at least some other information, like the private access information printed on the bottom-component 130, is encapsulated (e.g., enveloped, covered, hidden, enclosed, or otherwise concealed) by the top-component 121. Accordingly, as shown, the top-component 121 may have edges that extend beyond the edges of the bottom-component 130 in at least three directions (four are shown in the illustrated embodiments) but at least some information, like a unique identifier, that is printed on the bottom-component 130 remains visible when the top-component 121 is so configured and positioned to form the multi-component sticker 120 with the bottom-component 130. In other words, the top-component 121 may extend beyond at least a portion of the perimeter of the bottom component, such as along 60-90% of the perimeter of the bottom-component 130, to conceal at least some information disposed on the bottom-component and ensure that a user must lift away the top-component 121 to ascertain some or all of the concealed information disposed on the bottom-component 130. Thus, for example, while rectangular components are shown, other shapes may be utilized and the components may have different shapes (e.g., a first shape may be a circle and another a rectangle).

FIG. 6B illustrates example multi-component sticker 120 having a top-component 121 and a bottom-component 130. As shown, along the cut, the top-component 121 includes an optical code portion 123, a unique identifier portion 107B, and a window 127B. Within the window 127B, a portion of the bottom-component 130 is visible. The visible portion may correspond to a unique identifier portion 107C of the bottom-component 130 such that the multi-component sticker 120 may be visually inspected to ascertain whether the different components 121, 130 having different information printed thereon in optical code portions correspond to each other.

As shown, a bottom-component 130 may correspond to a first layer, L1, of the multi-component sticker 120. Upon the bottom-component 130, information may be printed thereon, such as first printed information, P1. The first printed information may include, along the cut, an optical code portion 333 and a unique identifier portion 107C. Private access information, like a private key of a public-private key-pair, or ciphertext hereof may be encoded as an optical code that is printed within the optical code portion 333 of the bottom-component. Similarly, a unique identifier may be printed within the unique identifier portion 107C, and the unique identifier portion 107C may correspond to an area of the bottom-component that is aligned with a window 127B of a top-component 121.

As shown, a top-component 121 may correspond to a first layer, L1, of the multi-component sticker 120. Upon the top-component 121, information may be printed thereon, such as second printed information, P2. The second printed information may include, along the cut, an optical code portion 123 and a unique identifier portion 107B. Public access information, like a public key (that corresponds to the above noted private key) or an address based on the public key and in a format of a decentralized computing platform or a unique address identifier for identification of an address or public key within a database, may be encoded as an optical code that is printed within the optical code portion 123 of the top-component. Similarly, a unique identifier may be printed within the unique identifier portion 107B. Within the top-component 121, a window 127B may be formed, such as by a removal of that area from the top-component (e.g., punching or cutting out the portion). As shown, the window 127B is aligned with an area (e.g., a unique identifier portion 107C) of the bottom-component 130 within which a unique identifier is printed, such that the unique identifier is visible through the window 127B in the multi-component sticker 120. Notably, at least some other information, like the private access information printed on the bottom-component 130, is concealed by the top-component 121. Accordingly, as shown, the top-component 121 may have edges that extend beyond the edges of the bottom-component 130 in at least three directions (four are shown, but with a partial edge of the bottom-component 130 exposed within the window 127B), but at least some information, like a unique identifier, that is printed on the bottom-component 130 remains visible when the top-component 121 is so configured and positioned to form the multi-component sticker 120 with the bottom-component 130. In other words, the top-component 121 may extend beyond at least a portion of the perimeter of the bottom component, such as along 60-90% of the perimeter of the bottom-component 130, to conceal at least some information disposed on the bottom-component and ensure that a user must lift away the top-component 121 to ascertain some or all of the concealed information disposed on the bottom-component 130. Thus, for example, while rectangular components are shown, other shapes may be utilized and the components may have different shapes (e.g., a first shape may be a circle and another a rectangle).

Further, as can be seen, the top-component 121 is disposed (or positioned) above the bottom-component 130 (e.g., normal to a surface of application below layer L1), such as to overlap and concealed some information 333 disposed on the bottom-component 130 while some other information 107C remains visible. In other words, the top-component 121 may encapsulate (e.g., envelope, cover, hide, enclose, or otherwise conceal) information 333 printed on the bottom-component 130. Notably, as the top-component 121 extends beyond the perimeter of the bottom-component 130 along at least some portions, above need not mean physically-above, as those portions of the top-component 121 extending beyond the perimeter of the bottom-component 130 need not be physically above one or more layers of the bottom-component 121 (e.g., in areas other than those in which the top-component 121 and bottom-component 130 overlap). Thus, as referred to herein, above can refer to a sequence of application or position for some portion of a layer but need not apply to all portions of the layer, e.g., layer L2 is physically above layer L1 where layer L2 overlaps with layer L1, and layer L2 is disposed above layer L1, but the extant portions of layer L2 that extend beyond the perimeter of layer L1 need not be physically above layer L1. For example, the extant portions of layer L2 that extend beyond the perimeter of layer L1 may adhere to a surface having a same height as that corresponding to layer L1 (although not required as, for example, a surface area corresponding to layer L1 may be countersunk in relation to a surface area corresponding to the extant portions of layer L2 or the surface area corresponding to the extant portions of layer L2 may be raised).

FIG. 6C, FIG. 6D, FIG. 6E, and FIG. 6F illustrate examples of components of a multi-component sticker, according to some embodiments. As described previously, a component may include multiple layers (e.g., a multi-layer component), these figures illustrate various examples of forming a component with multi-layers.

Figure 6C:
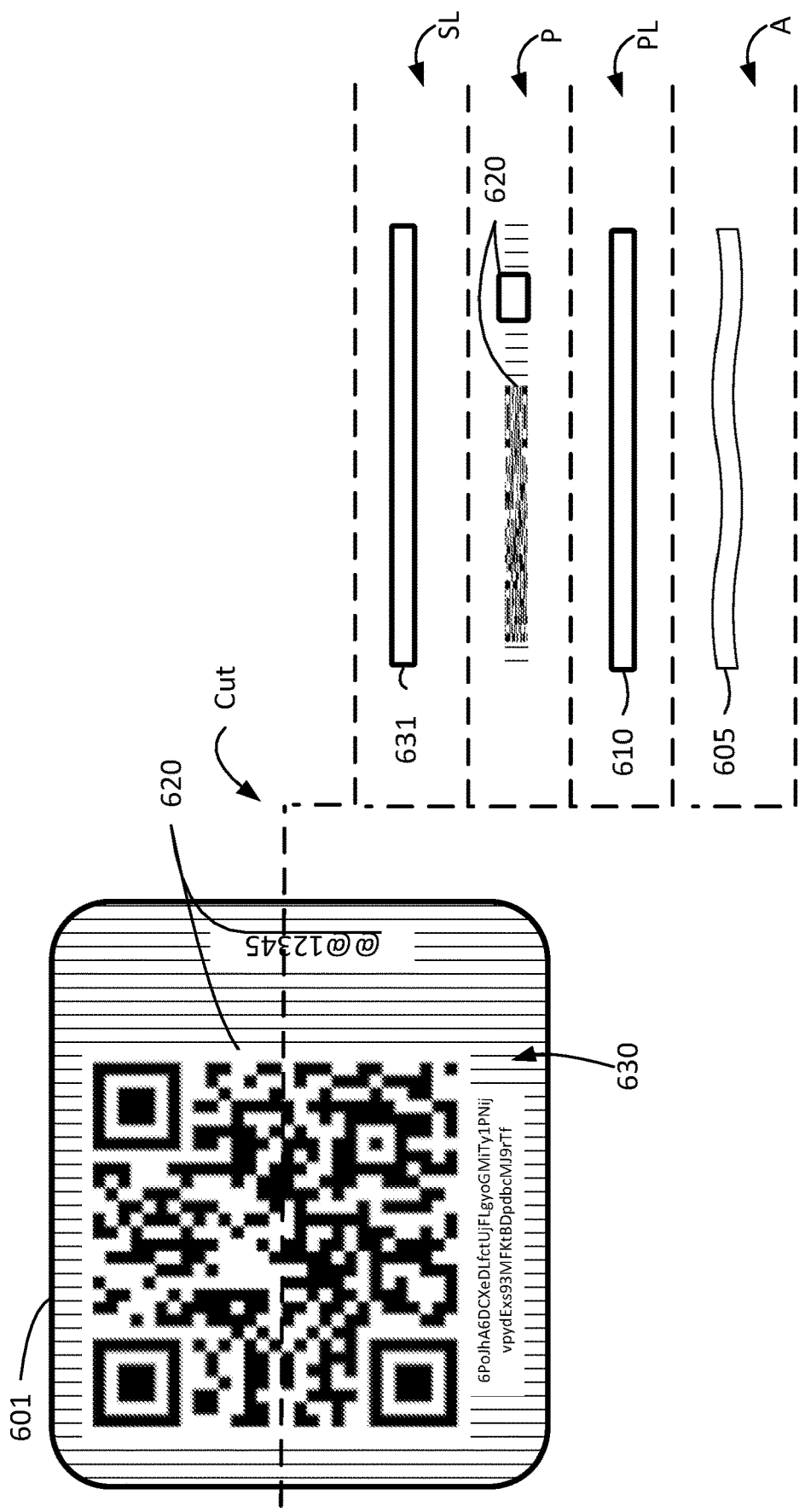

FIG. 6C illustrates an example multi-layer component, such as a bottom-component 630 having multiple layers. In some embodiments, the bottom-component 630 is formed as a sticker 601 that is later matched with another component sticker, like a top-component, to form a multi-component sticker. A cut through the component 630, which passes through the various layers is shown.

The example component 630 may include an adhesive layer, A, which includes an adhesive 605. The adhesive 605 may be formed as a layer or otherwise applied to an adjacent layer, PL, in the illustrated example.

The example component 630 may include a print layer, PL, like a layer 610 of PET or PP, on which information 620 is printed. In some embodiments, a layer 610 of PET or BOPET film is utilized for the print layer. The printing, P, of the print layer PL may utilize any applicable printing process. In some embodiments, a charged ink transfer process is utilized, and may transfer the information 620 along with any pattern or design to the print layer, PL. For example, electrically chargeable ink particles corresponding to the information 620 may be formed on the print layer. In some embodiments, the transfer printing process comprises heating and melting the ink particles into the print layer, such as by direct transfer of a minor of the information.

The example component 630 may include a surface layer, SL, like a layer 631 of PET or PP, to protect the printed information 620 (e.g., from elements or abrasion). In some embodiments, a layer 631 of transparent PET, BOPET, or BOPP film is utilized for the surface layer (e.g., such that the printed information 620 remains visible on a surface of the component 630).

Figure 6D:
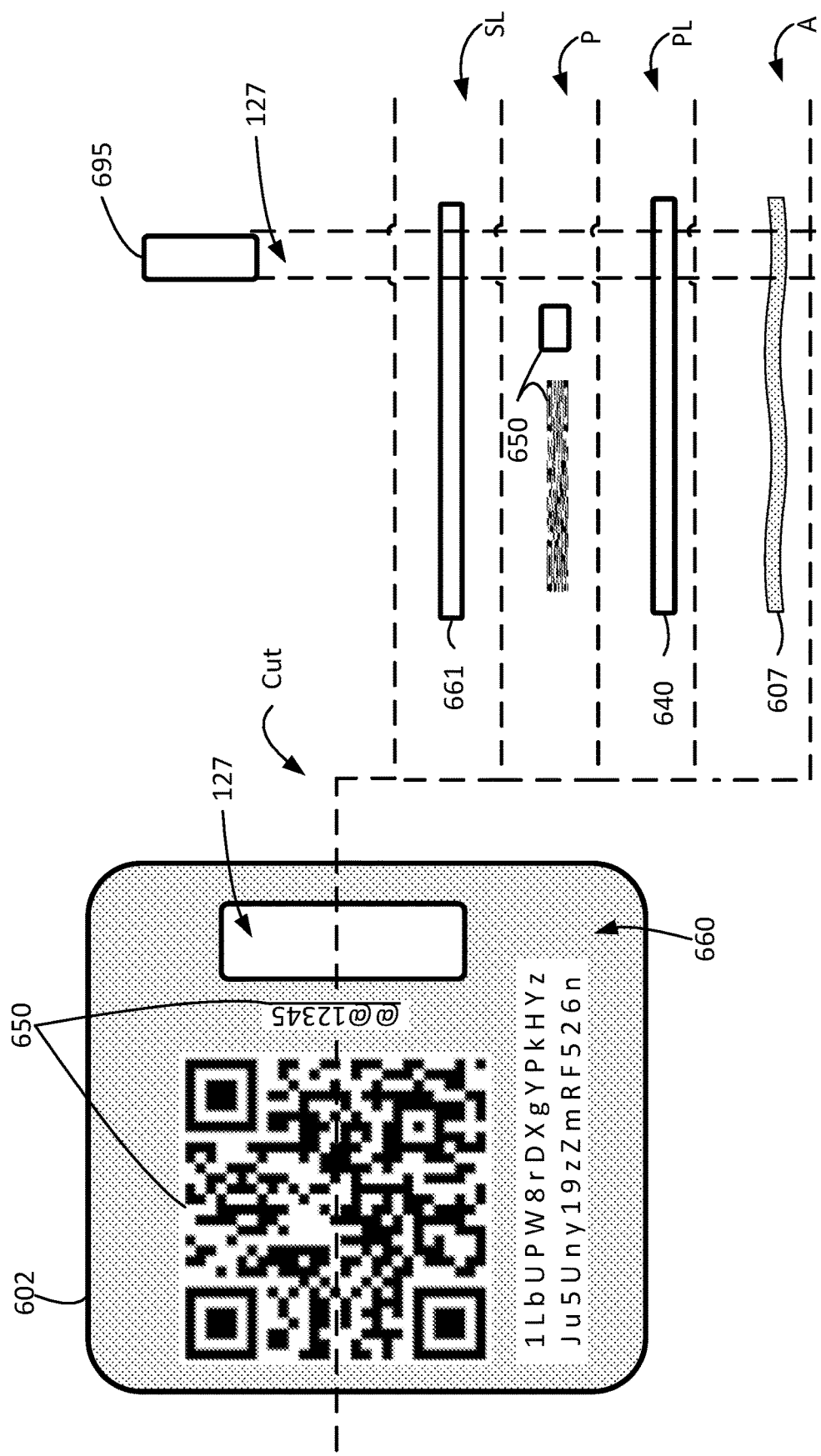
Figure 6E:
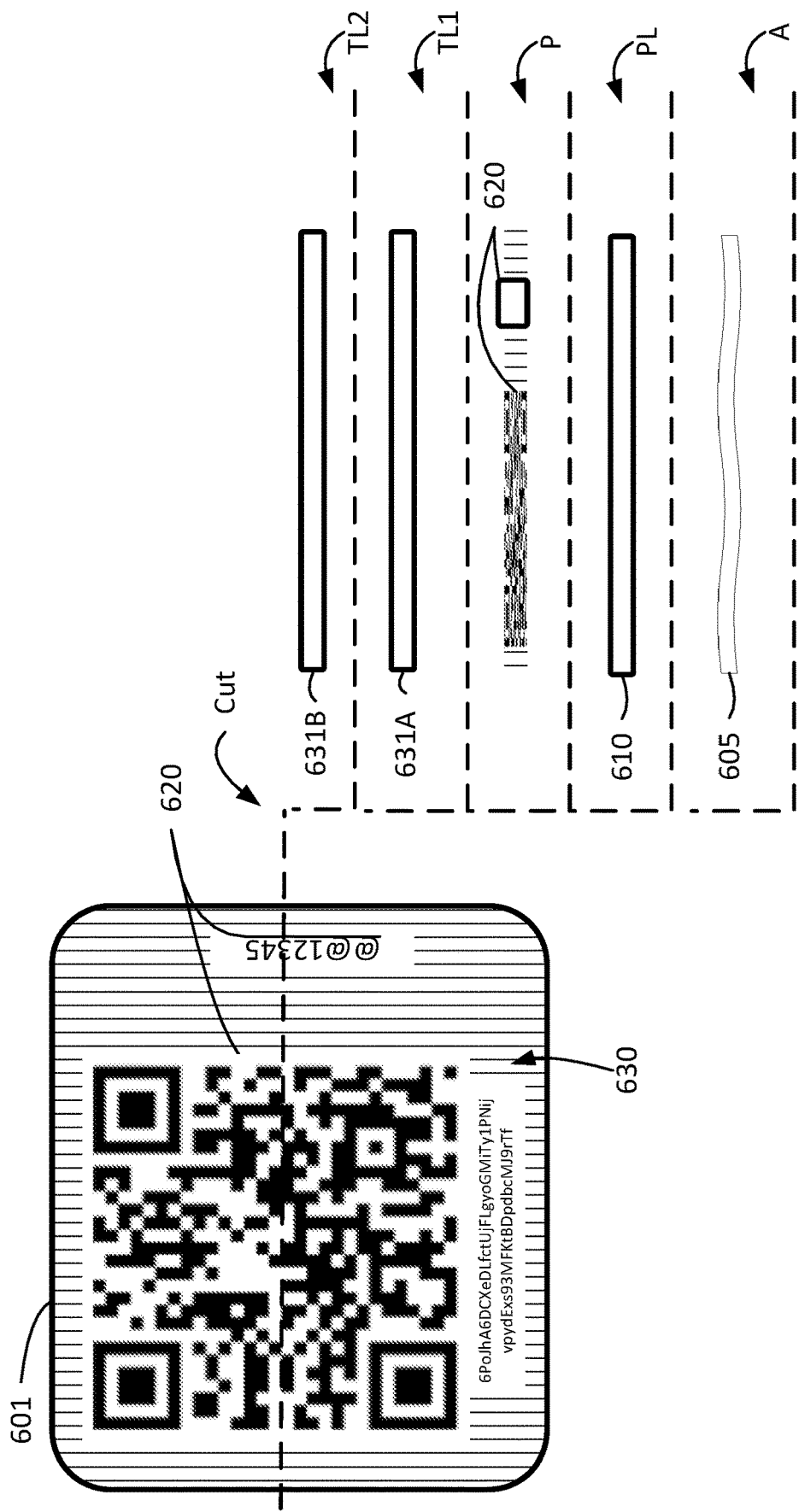

FIG. 6E illustrates an example multi-layer component, such as a bottom-component 630 having multiple layers. In some embodiments, the bottom-component 630 is formed as a sticker 601 that is later matched with another component sticker, like a top-component, to form a multi-component sticker. A cut through the component 630, which passes through the various layers is shown.

Compared to FIG. 6C, FIG. 6E illustrates multiple top layers, TL1, TL2 disposed above the print layer, PL rather than a single surface layer above the print layer. In some embodiments, a lower top layer 631A protects the printed information 620 (e.g., from one or more elements or abrasion). In some embodiments, a first layer 631A of transparent PET, BOPET, or BOPP film is utilized for the lower top layer 631A (e.g., such that the printed information 620 remains visible on a surface of the component 630). In some embodiments, an upper top layer 631B protects and conceals the printed information 620 (e.g., from view) or protects against one or more elements or abrasion, and those protective qualities may differ from the lower top layer 631A. In some embodiments, a second layer 631B of transparent PET, BOPET, or BOPP film is utilized for the lower top layer 631B (e.g., such that the printed information 620 remains visible on a surface of the component 630). In some embodiments, a second layer 613B comprises a scratch of material or metallized film (which in some cases may be foil-like or reflective) which may be removed to view the information 620 on the print layer but while in place prevents a scan from reading private access information printed on the bottom-component 601.

FIG. 6D illustrates an example multi-layer component, such as a top-component 660 having multiple layers. In some embodiments, the top-component 660 is formed as a sticker 602 that is later matched with another component sticker, like a bottom-component, to form a multi-component sticker. In some embodiments, the top-component 660 is formed over a bottom-component, such as by forming the illustrated layers over one or more existing layers. A cut through the component 660, which passes through the various layers is shown.

The example component 660 may include an adhesive layer, A, which includes an adhesive 607. The adhesive 607 may be tamper-evident and formed as a layer or otherwise applied to an adjacent layer, PL, in the illustrated example. In some embodiments, the adhesive 607 is colored and mitigates the passage of light therethrough (e.g., such that a material or information under the adhesive 607 is not visible). In some embodiments, the adhesive 607 may be reflective, such as to mitigate a scan of a material or information not visible under the adhesive 607. In some embodiments, a pattern is formed in the adhesive 607, like between the print layer, PL, and the adhesive, or underneath the adhesive. The pattern is formed such that when the print layer material, such as layer 640, is lifted away from a surface to which the adhesive 607 adheres the layer 640 to, a first portion of the adhesive 607 (e.g., corresponding to a first portion of the pattern) remains adhered to the layer 640 and a second portion of the adhesive 607 (e.g., corresponding to a second, opposing portion of the pattern) remains adhered to the surface to which the layer 640 was adhered. Accordingly, tampering with the component 660 such as by lifting the component (e.g., at least layer 640) away from the surface to which it was adhered to by the adhesive 607 provides indication of tampering.

The example component 660 may include a print layer, PL, like a layer 640 of PET or PP, on which information 650 is printed. In some embodiments, a layer 640 of PET or BOPET film is utilized for the print layer. The printing, P, of the print layer PL may utilize any applicable printing process. In some embodiments, a charged ink transfer process is utilized, and may transfer the information 650 along with any pattern or design to the print layer, PL. For example, electrically chargeable ink particles corresponding to the information 650 may formed on the print layer. In some embodiments, the transfer printing process comprises heating and melting the ink particles into the print layer, such as by direct transfer of a mirror of the information.

The example component 660 may include a surface layer, SL, like a layer 661 of PET or PP, to protect the printed information 650 (e.g., from elements or abrasion). In some embodiments, a layer 661 of transparent PET, BOPET, or BOPP film is utilized for the surface layer (e.g., such that the printed information 650 remains visible on a surface of the component 660). In some embodiments, one or more emblems may be embedded in the layer 661, like a foil emblem, which may be holographic or a foil design indicating authenticity of the component 660. In some embodiments, a scent is applied (e.g., like a coating) or otherwise impregnated into the layer 661, and which may be released when the surface is scratched.

In some embodiments, a window 127 is formed in the component 660. For example, a tool 695 may pass through the layers of the component 660 and remove that portion of the component to form a window. In some embodiments, the tool 695 may cut to a specific depth corresponding to the adhesive such that the adhesive and layers of the component 660 are removed without penetrating through an underlaying material. In some alternate embodiments, a tamper-evident adhesive 607 may not be disposed in an area corresponding to the window 127, for example, a transparent (or no adhesive) may be disposed within the area corresponding to the window 127. Further, within that area, the other layers may have a transparent portion such that an underlaying material or information on that material may be visible through the window 127.

FIG. 6F illustrates an example multi-layer component, such as a top-component 660 having multiple layers. In some embodiments, the top-component 660 is formed as a sticker 602 that is later matched with another component sticker, like a bottom-component, to form a multi-component sticker. In some embodiments, the top-component 660 is formed over a bottom-component, such as by forming the illustrated layers over one or more existing layers. A cut through the component 660, which passes through the various layers is shown.

Compared to Figure OD, FIG. 6F illustrates an additional underlaying layer, UL, between the print layer, PL, and the adhesive layer, A. In some embodiments, the underlaying layer 670 includes one or more tamper-evident features or anti-tamper features to prevent a nefarious party from ascertaining information below the layer 670. In some embodiments, the layer 670 is a metalized PET, BOPET, or BOPP film or foil or pattern of foil or film by which underlaying information may be obfuscated. In some embodiments, layer 670 and the adhesive layer 607 both act to obfuscate information under the component 660 and may optionally include different tamper-evident features (e.g., visible in the component 660 or surface to which it adheres when the component 660 is tampered with) or anti-tamper features (e.g., preventing a scan or visual reading through the component 660) to conceal information underlaying the component 660, such as information printed a bottom-component or other surface to which the component 660 is adhered (e.g., information or surface area that is not visible through the window 127).

In the interest of brevity, additional techniques applicable to at least some embodiments of the multi-component apparatuses with cross-component deterministic values and underlying value protection described herein are incorporated by reference to various U.S. patent applications named below.

U.S. patent application Ser. No. 16/568,185, titled Physical, Tamper-Evident Cryptocurrency Card, filed 14 Dec. 2022, the entire contents of which is incorporated herein by reference, describes computing systems and techniques for generating values like those described herein in a secure fashion, and those techniques are applicable to at least some embodiments of the multi-component apparatuses with cross-component deterministic values and underlying value protection described herein.

U.S. patent application Ser. No. 18/081,521, titled Customizable Cryptocurrency Card, filed 14 Dec. 2022, the entire contents of which is incorporated herein by reference, describes computing systems and techniques for generating values like those described herein in a secure fashion, which includes those for customization, and those techniques are applicable to at least some embodiments of the multi-component apparatuses with cross-component deterministic values and underlying value protection described herein.

For example: some embodiments include computing infrastructure configured to securely generate values for apparatuses, some embodiments include computing systems to support one or more features pertaining to utility of a physical apparatus that maintains access information for digital bearer assets, and some embodiments include native applications which may be executed on a mobile device of a user to provide access to features pertaining to utility of a physical apparatus that maintains access information for digital bearer assets, among other functions and processes described in the above noted U.S. patent applications.

Where the U.S. patent applications noted above, and the present application, describe computer processes or systems, systems may include computing devices similar to that described with reference to FIG. 7 and those processes may be executed on such computing devices.

Figure 7:
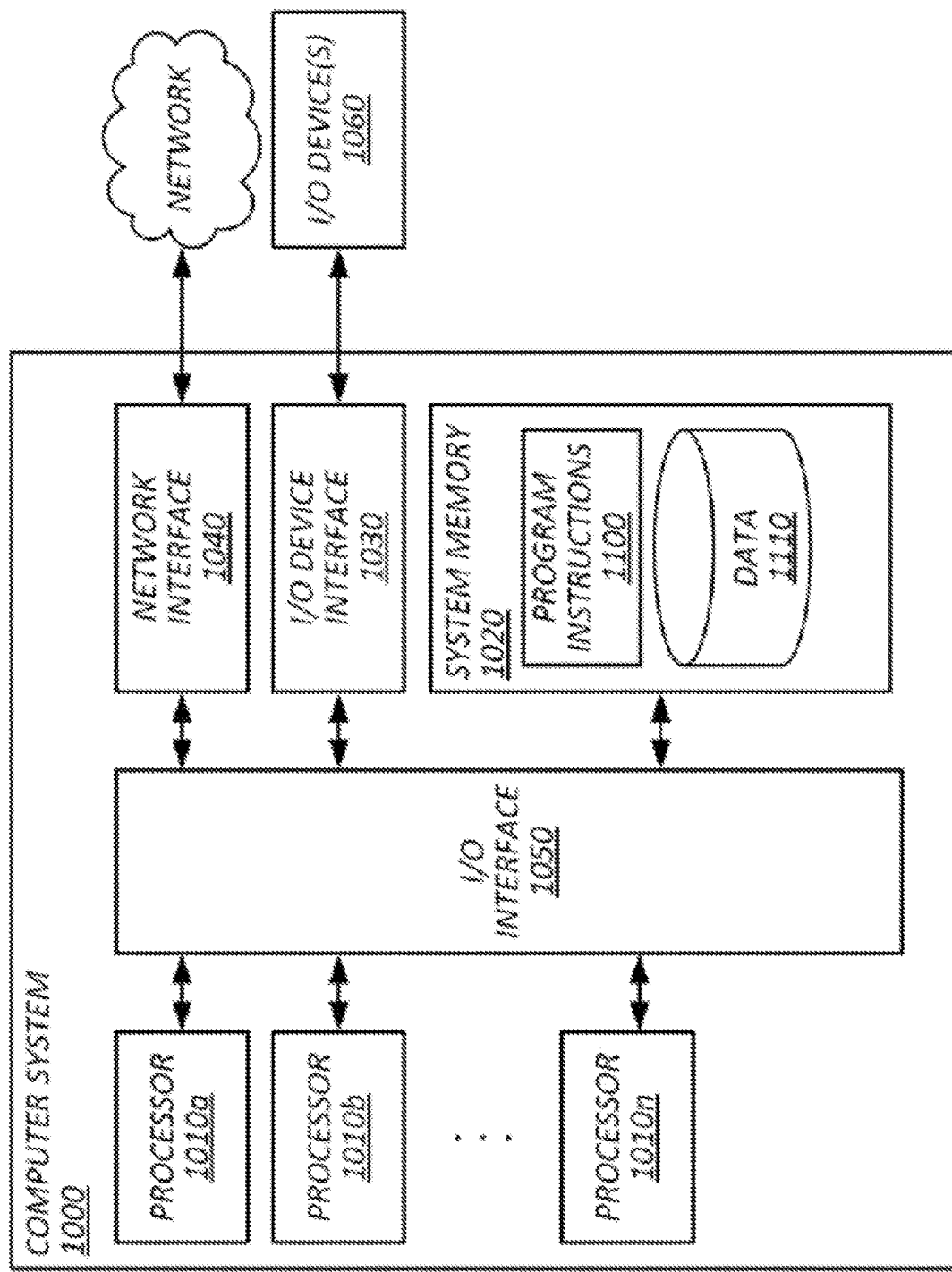
FIG. 7 illustrates an example computing system in accordance with embodiments of the present techniques.

FIG. 7 illustrates an example computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems, which may also be decentralized) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically or among different parties (e.g., decentralized)), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text;

images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call, and arguments (e.g., in a request) or corresponding result (e.g., in a response) may be wholly or partially communicated (e.g., arguments may be communicated over one or more requests and results may be communicated in one or more responses, which need not have direct correspondence). Similarly, reference to "a computer system" performing step A and "the computer system" performing step B can include the same computing device within the computer system performing both steps or different computing devices within the computer system performing steps A and B.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. An apparatus for physically maintaining digital wallet credentials, comprising:
   a substrate having a surface area corresponding to a face of the substrate, the surface area comprising:
      a first region of the surface area including a first unique identifier, and
      a second region of the surface area including a passphrase; and
   a multi-layer sticker affixed to the face of the substrate, the multi-layer sticker comprising:
      a first layer concealing all or some of the second region of the substrate without concealing the first unique identifier within the first region, and having disposed thereon:
         a second unique identifier, and
         encrypted private key information, the encrypted private key information based on the passphrase and a private key of a key-pair;
      a second layer encapsulating a portion of the first layer to conceal the encrypted private key information without concealing the first unique identifier and the second unique identifier, the second layer comprising at least one tamper-evident feature and having disposed thereon:
         a third unique identifier, and
         public access information;
      wherein a correspondence of values of the unique identifiers indicates a correspondence between the passphrase, the encrypted private key information, and the public access information, wherein:
         the substrate is round;
         the second layer covers a portion of private access information disposed on the face of the substrate;
         the portion of private access information disposed on the face of the substrate is the passphrase within the second region; and
         the second layer covers all or some of the passphrase.

2. The apparatus of claim 1, wherein the substrate is a circular body of metal.
3. The apparatus of claim 1, wherein the second layer conceals all of the passphrase.
4. The apparatus of claim 1, wherein:
   the first layer that conceals all or some of the second region of the substrate conceals all or some of the passphrase.
5. The apparatus of claim 1, wherein:
   the second layer conceals private access information disposed on both the face of substrate and the first layer, the private access information including the encrypted private key information and the passphrase.
6. An apparatus for physically maintaining digital wallet credentials, comprising:
   a substrate having a surface area corresponding to a face of the substrate, the surface area comprising:
      a first region of the surface area including a first unique identifier, and
      a second region of the surface area including a passphrase; and
   a multi-component sticker affixed to the face of the substrate, the multi-component sticker comprising:
      a first component concealing all or some of the second region of the substrate without concealing the first unique identifier within the first region, and having disposed thereon:
         a second unique identifier, and
         encrypted private key information, the encrypted private key information based on the passphrase and a private key of a key-pair;
      a second component encapsulating a portion of the first component to conceal the encrypted private key information without concealing the first unique identifier and the second unique identifier, the second component comprising at least one tamper-evident feature and having disposed thereon:
         a third unique identifier, and
         public access information;
   wherein a correspondence of values of the unique identifiers indicates a correspondence between the passphrase, the encrypted private key information, and the public access information, wherein:
      the second component covers a portion of private access information disposed on the face of the substrate;
      the portion of private access information disposed on the face of the substrate is the passphrase disposed within the second region; and
      the second component covers all or some of the passphrase.
7. The apparatus of claim 6, wherein:
   the substrate is a round body of metal.
8. The apparatus of claim 7, wherein:
   the second layer conceals all of the passphrase.
9. The apparatus of claim 6, wherein:
   the first component that conceals all or some of the second region of the substrate conceals all or some of the passphrase.
10. The apparatus of claim 6, wherein:
    the second component conceals private access information disposed on both the face of substrate and the first component, the private access information including the encrypted private key information and the passphrase.
11. An apparatus for physically maintaining digital wallet credentials comprising:

a multi-layer sticker comprising:
  a first information layer comprising a first identifier and private key ciphertext information, the private key ciphertext information associated with a passphrase by which a private key is obtainable in plaintext based on the private key ciphertext information and the passphrase;
  a first adhesive layer by which the first information layer is adhered to a surface;
  a second information layer comprising a second identifier and public information associated with the private key plaintext, the second information layer concealing a portion of the first information layer comprising the private key ciphertext information without concealing the first identifier; and
  a second adhesive layer by which the second information layer is adhered to the surface, the second adhesive layer configured to render visually evident lifting of the second information layer from the surface to reveal the concealed portion of the first information layer; and
a substrate comprising:
  a first surface region including the passphrase disposed thereon and the surface to which the multi-layer sicker is adhered; and
  a second surface region including a third identifier;
wherein a correspondence of values of the identifiers indicates a correspondence between the passphrase, the private key ciphertext information, and the public information, wherein:
  the multi-layer sicker covers a portion of private access information disposed on the surface of the substrate;
  the portion of private access information disposed on the surface of the substrate is the passphrase disposed within the first surface region; and
  the multi-layer sicker covers all or some of the passphrase.

12. The apparatus of claim 11, wherein:
the substrate is a round body of metal.

13. The apparatus of claim 12, wherein:
the second information layer conceals all of the passphrase.

14. The apparatus of claim 11, wherein:
the first information layer conceals all or some of the passphrase within the first region.

15. The apparatus of claim 11, wherein:
the second information layer conceals all of the passphrase within the first region.

16. An apparatus for physically maintaining digital wallet credentials comprising:
  a multi-component sticker comprising:
    a first component having a first identifier and private key ciphertext information disposed thereon, the private key ciphertext information associated with a passphrase by which a private key is obtainable in plaintext based on the private key ciphertext information and the passphrase, and a first adhesive by which the first component is adhered to a surface;
    a second component having a second identifier and public information disposed thereon, the public information associated with the private key plaintext, the second component concealing a portion of the first component comprising the private key ciphertext information without concealing the first identifier, and a second adhesive by which the second component is adhered to the surface, the second adhesive configured to render visually evident lifting of the second component from the surface to reveal the concealed portion of the first component; and
  a substrate comprising:
    a first surface region including the passphrase disposed thereon and the surface to which the multi-component sicker is adhered; and
    a second surface region including a third identifier;
  wherein a correspondence of values of the identifiers indicates a correspondence between the passphrase, the private key ciphertext information, and the public information, wherein:
    the multi-component sicker covers a portion of private access information disposed on the surface of the substrate;
    the portion of private access information disposed on the surface of the substrate is the passphrase disposed within the first surface region, and
    the multi-layer sicker covers all or some of the passphrase.

17. The apparatus of claim 16, wherein:
the substrate is a round body of metal.

18. The apparatus of claim 17, wherein:
the multi-layer sicker conceals all of the passphrase.

19. The apparatus of claim 16, wherein:
the first component conceals all or some of the passphrase within the first region.

20. The apparatus of claim 16, wherein:
the second component conceals all of the passphrase within the first region.

* * * * *